(12) United States Patent
Yamazaki

(10) Patent No.: US 10,173,130 B2
(45) Date of Patent: Jan. 8, 2019

(54) INFORMATION PROCESSING SYSTEM, EXTENDED INPUT DEVICE, AND INFORMATION PROCESSING METHOD

(71) Applicant: NINTENDO CO., LTD., Kyoto (JP)

(72) Inventor: Hitoshi Yamazaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/687,771

(22) Filed: Aug. 28, 2017

(65) Prior Publication Data

US 2018/0065035 A1    Mar. 8, 2018

(30) Foreign Application Priority Data

Sep. 5, 2016  (JP) .................................. 2016-172915

(51) Int. Cl.
| | | |
|---|---|---|
| A63F 13/23 | (2014.01) | |
| A63F 13/211 | (2014.01) | |
| A63F 13/24 | (2014.01) | |
| A63F 13/40 | (2014.01) | |
| G06F 1/16 | (2006.01) | |
| A63F 9/24 | (2006.01) | |

(52) U.S. Cl.
CPC ............ *A63F 13/23* (2014.09); *A63F 13/211* (2014.09); *A63F 13/24* (2014.09); *A63F 13/40* (2014.09); *G06F 1/1669* (2013.01); *G06F 1/1671* (2013.01); *A63F 9/24* (2013.01); *G06F 1/16* (2013.01)

(58) Field of Classification Search
CPC ........ A63F 13/23; A63F 13/211; A63F 13/24; A63F 13/40; G06F 1/1669; G06F 1/1671
See application file for complete search history.

(56) References Cited

U.S. PATENT DOCUMENTS

| | | | |
|---|---|---|---|
| 2010/0007528 A1 | 1/2010 | Urata et al. | |
| 2014/0282282 A1* | 9/2014 | Holz | G06F 3/0304 715/863 |
| 2016/0313866 A1* | 10/2016 | Pacheco | G06F 3/0425 |

FOREIGN PATENT DOCUMENTS

JP      2010-017387      1/2010

* cited by examiner

*Primary Examiner* — Leon Flores
(74) *Attorney, Agent, or Firm* — Nixon & Vanderhye PC

(57) ABSTRACT

In a state where an extended input device is secured to a data transmission device, an image capturing unit of the data transmission device captures an image of a light emitting unit that emits light, an image of which is allowed to be captured by the image capturing unit in accordance with a user input and/or a user operation, and data generated based on at least the captured image is transmitted to an information processing apparatus. The information processing apparatus executes an information process based on the transmitted data.

21 Claims, 20 Drawing Sheets

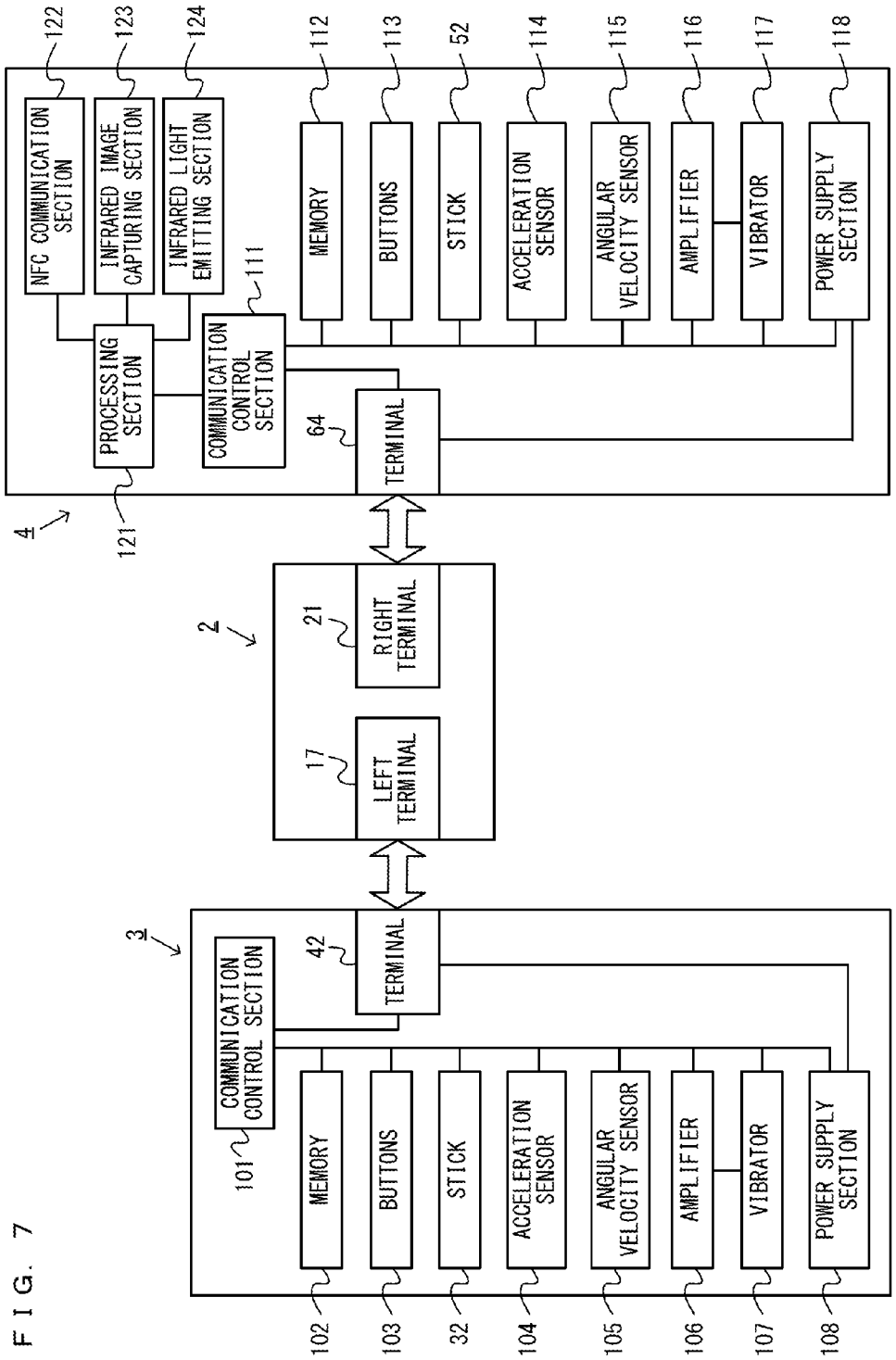
F I G. 7

F I G. 8
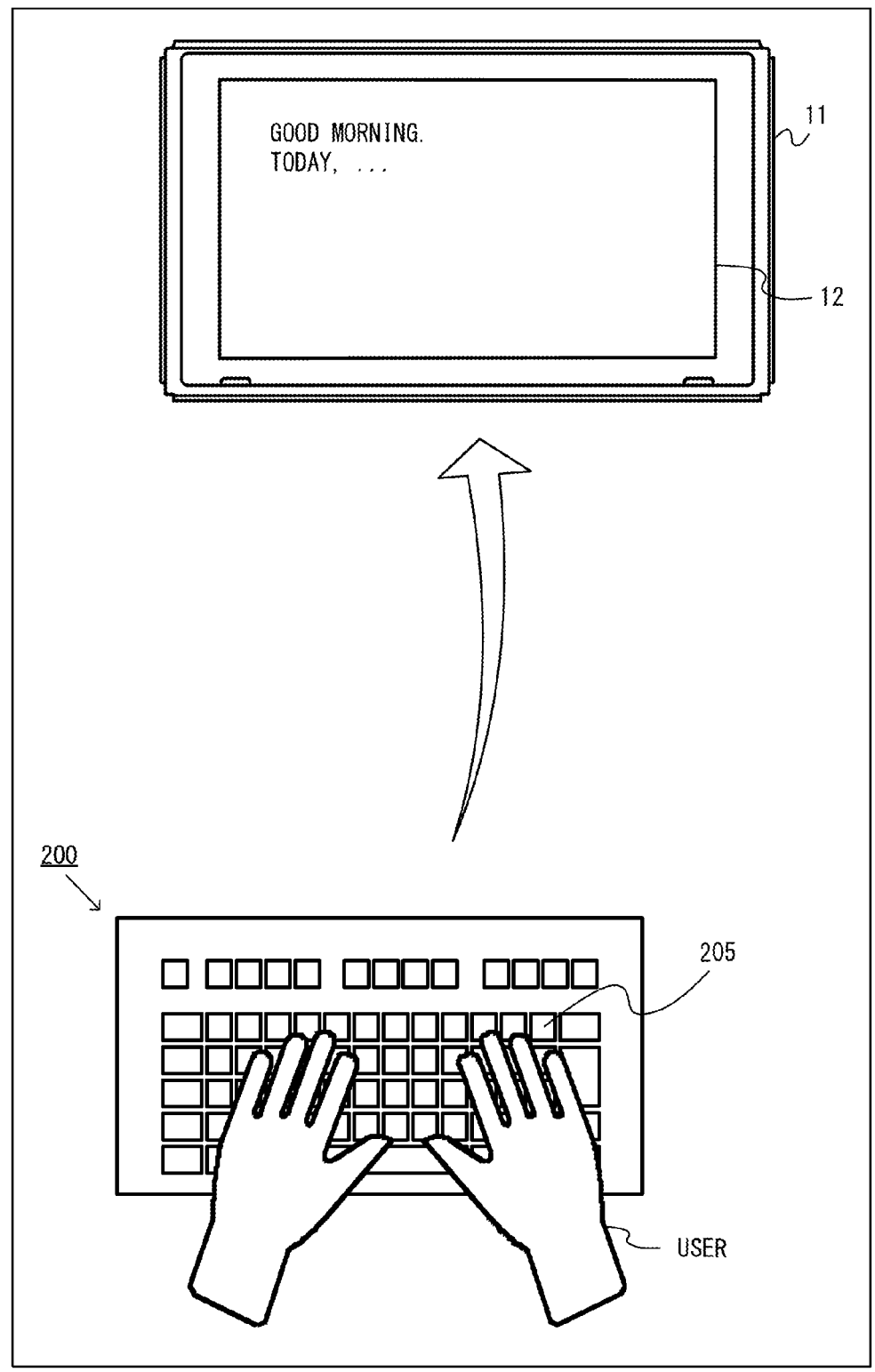

F I G. 1 3
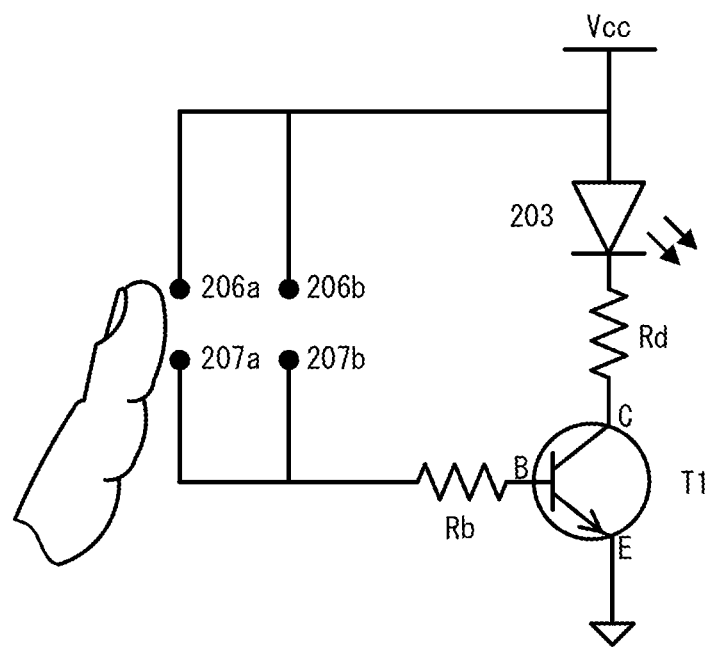

INFORMATION PROCESSING SYSTEM, EXTENDED INPUT DEVICE, AND INFORMATION PROCESSING METHOD

CROSS REFERENCE TO RELATED APPLICATION

The disclosure of Japanese Patent Application No. 2016-172915 filed on Sep. 5, 2016 is incorporated herein by reference.

FIELD

The technology shown herein relates to an information processing system, an extended input device, and an information processing method, and more specifically, an information processing system including an information processing apparatus, a data transmission device and an extended input device secured to the data transmission device, the extended input device in the information processing system, and an information processing method.

BACKGROUND AND SUMMARY

Conventionally, there is an accessory device connectable to a mobile device to add a function to the mobile device. For example, there is a technology for connecting, to a connector provided in a controller of a apparatus, another controller as an accessory device. With such a technology, two controllers are usable to provide a wider variety of game operations.

However, the above-described accessory device includes a circuit usable for communicating with the mobile device and a circuit usable for an information process of generating information to be transmitted to the mobile device. Therefore, there is room for improvement, more specifically, for simplification of the structure of the accessory device.

Therefore, it is an object of an exemplary embodiment to provide an information processing system realized by a simple structure, an extended input device, and an information processing method.

In order to achieve the above-described object, the exemplary embodiment may employ, for example, the following configurations. It is understood that, in order to interpret the claims, the scope of the claims should be interpreted only by the recitations of the claims. If there is a contradiction between the recitations of the claims and the descriptions of the specification, the recitations of the claims take precedence.

An example of information processing system in the exemplary embodiment includes an information processing apparatus executing an information process; a data transmission device transmitting data to the information processing apparatus; and an extended input device secured to the data transmission device. The data transmission device includes an image capturing unit; and a transmission section. The transmission section transmits, to the information processing apparatus, at least data generated based on an image captured by the image capturing unit. The extended input device includes a securing portion; an operation input portion; and a light emitting unit. The securing portion secures the extended input device to the data transmission device. The operation input portion is usable by a user to make a user input and/or a user operation for the information process. The light emitting unit is located such that an image thereof is allowed to be captured by the image capturing unit, and emits light, an image of which is allowed to be captured by the image capturing unit in accordance with the user input to, and/or the user operation on, the operation input portion, in a state where the light emitting unit is secured to the data transmission device. The information processing apparatus includes a receiving section and a processing section. The receiving section receives the data transmitted from the transmission section. The processing section executes the information process based on the data received by the receiving section.

According to the above, the extended input device is attached to the data transmission device that captures an image of the light emitting unit that emits light in accordance with the user input and/or the user operation. By use of the data generated based on the captured image of the light emitting unit, the information process is executed. Therefore, the extended input device does not need to include an electric component that transmits the result of the detection of the user input or the user operation to the information processing apparatus. For this reason, the structure of the extended input device is simplified. As compared the case where the captured image itself is transmitted from the data transmission device to the information processing apparatus, the amount of data to be transmitted is decreased.

The operation input portion may include a plurality of operation input members. The light emitting unit may include a plurality of light emitting members, and at least one of the plurality of light emitting members, corresponding to at least one of the operation input members subjected to the user input and/or the user operation, may emit light.

According to the above, the light emitting unit that is emitting light is detected, so that the operation input member subjected to the user input and/or the user operation is distinguished.

The data transmission device may further include an image processing section. The image processing section acquires coordinate information on a portion having a high luminance in the image captured by the image capturing unit. In this case, the data transmission device may transmit the coordinate information acquired by the image processing section, as the data generated based on the image captured by the image capturing unit. The processing section may specify which one of the plurality of light emitting members is emitting light based on the data received by the receiving section, and execute the information process based on the user input to, and/or the user operation on, the operation input member corresponding to the light emitting member that is emitting light.

According to the above, an image of the light emitting unit that emits light in accordance with the user input and/or the user operation is captured, so that the user input to, and/or the user operation on, the extended input device is distinguished. Therefore, various types of extended input devices may be added by use of the same predetermined data format with no need to prepare a new data format.

The image capturing unit may be an infrared camera. The plurality of light emitting members may be a plurality of infrared LEDs.

According to the above, an image of the infrared light emitted by the infrared LED is captured by the infrared camera. Therefore, the possibility of wrong recognition due to external light is decreased.

The plurality of infrared LEDs may each be located at any of positions arrayed in a matrix on a predetermined surface.

According to the above, the locations of the plurality of infrared LEDs are easily managed and grasped.

The predetermined surface may be located inclined with respect to an image capturing direction of the image capturing unit in a state where the predetermined surface is secured to the data transmission device.

According to the above, the size of the space for locating the light emitting unit is decreased.

The information processing apparatus may be a game apparatus main body. The data transmission device may be a game controller including an operation unit. The transmission section may transmit data including at least data from the operation unit of the data transmission device and the data generated based on the image captured by the image capturing unit.

According to the above, the game apparatus main body and the game controller are combined with the extended input device that does not have a function of communicating with the game apparatus main body to provide an information processing system.

The operation input portion may include a plurality of switches turned on or off in accordance with the user input and/or the use operation. The light emitting unit may include a plurality of light emitting members, and at least one of the plurality of light emitting members 203 corresponding to at least one of the switches turned on in accordance with the user input and/or the use operation may be made conductive to emit light.

According to the above, the plurality of light emitting members are caused to emit light by use of the plurality of switches in accordance with the user input and/or the user operation.

The operation input portions may include a plurality of contact members contactable with a body of the user. The light emitting unit may include a plurality of light emitting members, and at least one of the plurality of light emitting members corresponding to at least one of the plurality of contact members in contact with the body of the user may be made conductive to emit light.

According to the above, the plurality of light emitting members are caused to emit light by use of the plurality of contact members in accordance with the user input and/or the user operation.

The light emitting unit may cause different light emitting members, among the plurality of light emitting members, to emit light in accordance with an amount of the user input to, and/or the user operation on, the operation input member.

According to the above, the presence/absence of, and the amount of, the user input and/or the user operation is distinguished by the light emission of the light emitting members.

The data transmission device may further include a near field communication section. The near field communication section performs near field communication with another device. The extended input device may further include an information storage medium. The information storage medium is located at a position where the information storage medium is capable of performing the near field communication with the near field communication section in a state of being secured to the data transmission device by the securing portion, and performs the near field communication with the near field communication section. In this case, the transmission section may transmit data including at least data acquired from the information storage medium by the near field communication and the data generated based on the image captured by the image capturing unit. The processing section may execute the information process in accordance with the user input and/or the user operation made by use of the extended input device, based on the data acquired from the information storage medium and the data generated based on the image captured by the image capturing unit.

According to the above, a process based on the information stored on the information storage medium is made possible. For example, a process of determining the type of the extended input device, a process of authenticating the extended input device, or a process of acquiring calibration information on the extended input device is made possible.

The exemplary embodiment may be carried out in the form of an extended input device or an information processing method.

According to the exemplary embodiment, the extended input device is realized with a simple structure.

These and other objects, features, aspects and advantages of the exemplary embodiment will become more apparent from the following detailed description when taken in conjunction with the accompanying drawings.

BRIEF DESCRIPTION OF THE DRAWINGS

FIG. 7 is a block diagram showing a non-limiting example of internal structure of the main body apparatus 2, the left controller 3 and the right controller 4;

FIG. 8 shows a non-limiting example of letter input made by a user by use of an extended input device 200;

FIG. 13 shows another non-limiting example of circuit causing the infrared LED 203 to emit light in accordance with the input operation made on the input key 205;

DETAILED DESCRIPTION OF NON-LIMITING EXAMPLE EMBODIMENTS

Figure 1:
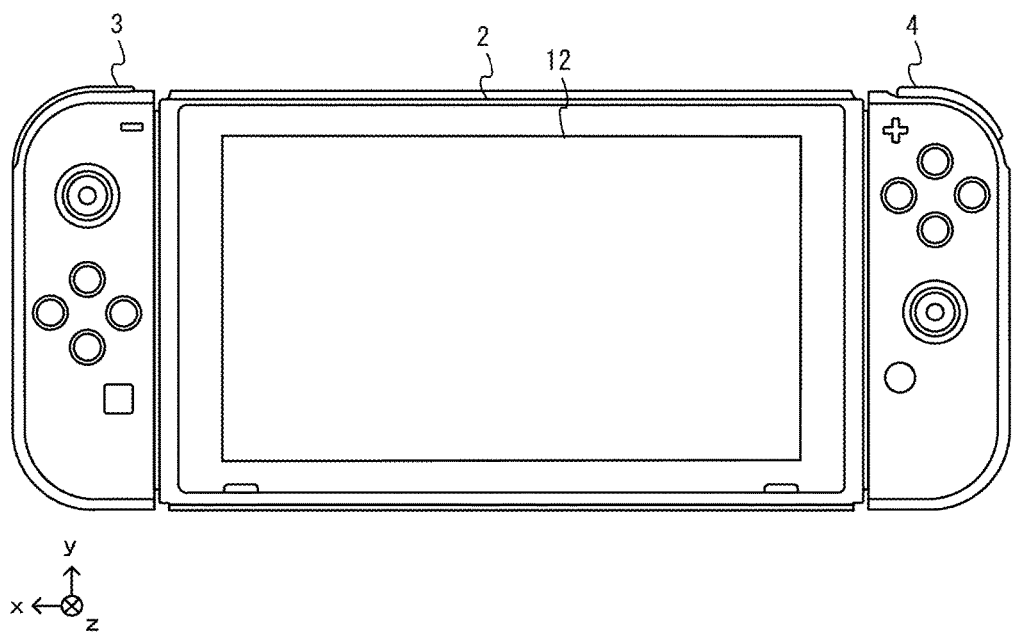
FIG. 1 shows a non-limiting example of state where a left controller 3 and a right controller 4 are attached to a main body apparatus 2.

A description is given below of an information processing system according to an exemplary embodiment. An example of information processing system according to the exemplary embodiment includes a main body apparatus (information processing apparatus; acts as a game apparatus main body in the exemplary embodiment) 2, a left controller 3, a right controller 4, and an extended input device 200. The left controller 3 and the right controller 4 are attachable to, and detachable from, the main body apparatus 2. The left controller 3 and the right controller 4 may be attached to the main body apparatus 2, so that the resultant assembly is used as an integrated device. Alternatively, the main body apparatus 2, the left controller 3 and the right controller 4 are usable as separate bodies (see FIG. 2). The information processing system is usable in a form in which an image is displayed on the main body apparatus 2, and in a form in which an image is displayed on another display device such as a TV or the like (e.g., a stationary monitor). In the former form, the information processing system is usable as a mobile apparatus (e.g., a mobile game apparatus). In the latter form, the information processing system is usable as a stationary apparatus (e.g., a stationary game apparatus). The extended input device 200 in the information processing system extends a user input and/or a user operation in a state where a controller (e.g., right controller 4) is attached to the inside of the extended input device 200.

FIG. 1 shows a state where the left controller 3 and the right controller 4 are attached to the main body apparatus 2. As shown in FIG. 1, the left controller 3 and the right controller 4 are attached to, and integrated with, the main body apparatus 2. The main body apparatus 2 is an apparatus that executes various processes (e.g., game process) in the information processing system. The main body apparatus 2 includes a display 12. The left controller 3 and the right controller 4 are each a device including an operation section allowing a user to make an input thereto.

Figure 2:
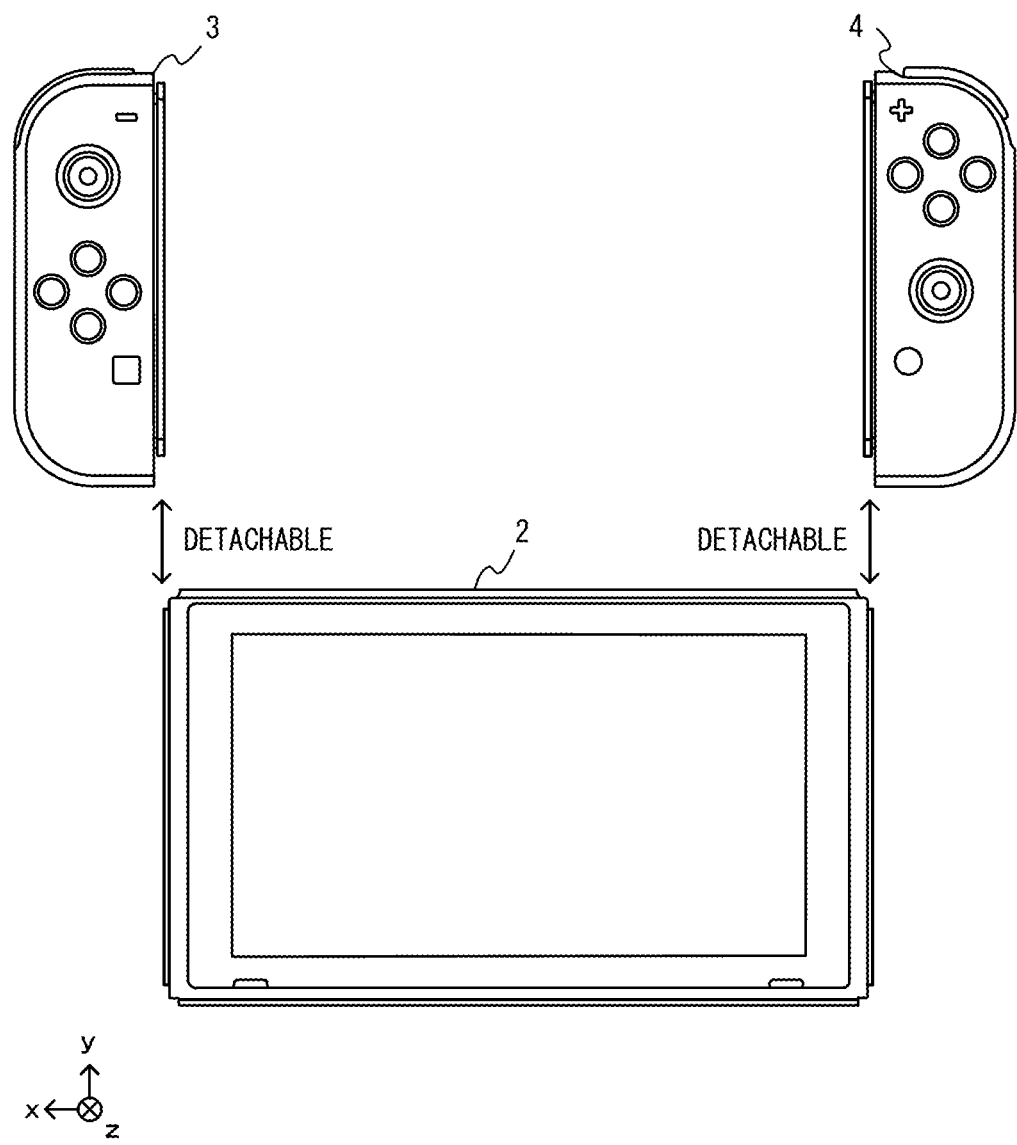
FIG. 2 shows a non-limiting example of state where the left controller 3 and the right controller 4 are detached from the main body apparatus 2.

FIG. 2 shows an example of state where the left controller 3 and the right controller 4 are detached from the main body apparatus 2. As shown in FIG. 1 and FIG. 2, the left controller 3 and the right controller 4 are attachable to, and detachable from, the main body apparatus 2. The left controller 3 is attachable to a left side surface (side surface on a positive side in an x-axis direction shown in FIG. 1) of the main body apparatus 2, and is attachable to, and detachable from, the main body apparatus 2 by being slid along the left side surface of the main body apparatus 2 in a y-axis direction shown in FIG. 1. The right controller 4 is attachable to a right side surface (side surface on a negative side in the x-axis direction shown in FIG. 1) of the main body apparatus 2, and is attachable to, and detachable from, the main body apparatus 2 by being slide along the right side surface of the main body apparatus 2 in the y-axis direction shown in FIG. 1. Hereinafter, the left controller 3 and the right controller 4 will occasionally be referred to collectively as "controllers". In the exemplary embodiment, an "operation device" operable by a single user may be a single controller (e.g., one of the left controller 3 and the right controller 4) or a plurality of controllers (e.g., both the left controller 3 and the right controller 4, or at least either the left controller 3 or the right controller 4 and another controller). The "operation device" includes at least one controller. The left controller 3 and/or the right controller 4 detached from the main body apparatus 2 may also act as a game controller. In this case, the main body apparatus 2 acts as a game apparatus main body. In the exemplary embodiment, one controller (e.g., right controller 4) may be attached to the extended input device 200, so that an information process which is being executed by the main body apparatus 2 (e.g., a letter input process or a game process) is controlled in accordance with a user input to, and/or a user operation on, the extended input device 200. Hereinafter, an example of specific configuration of the main body apparatus 2, the left controller 3, and the right controller 4 will be described.

Figure 3:
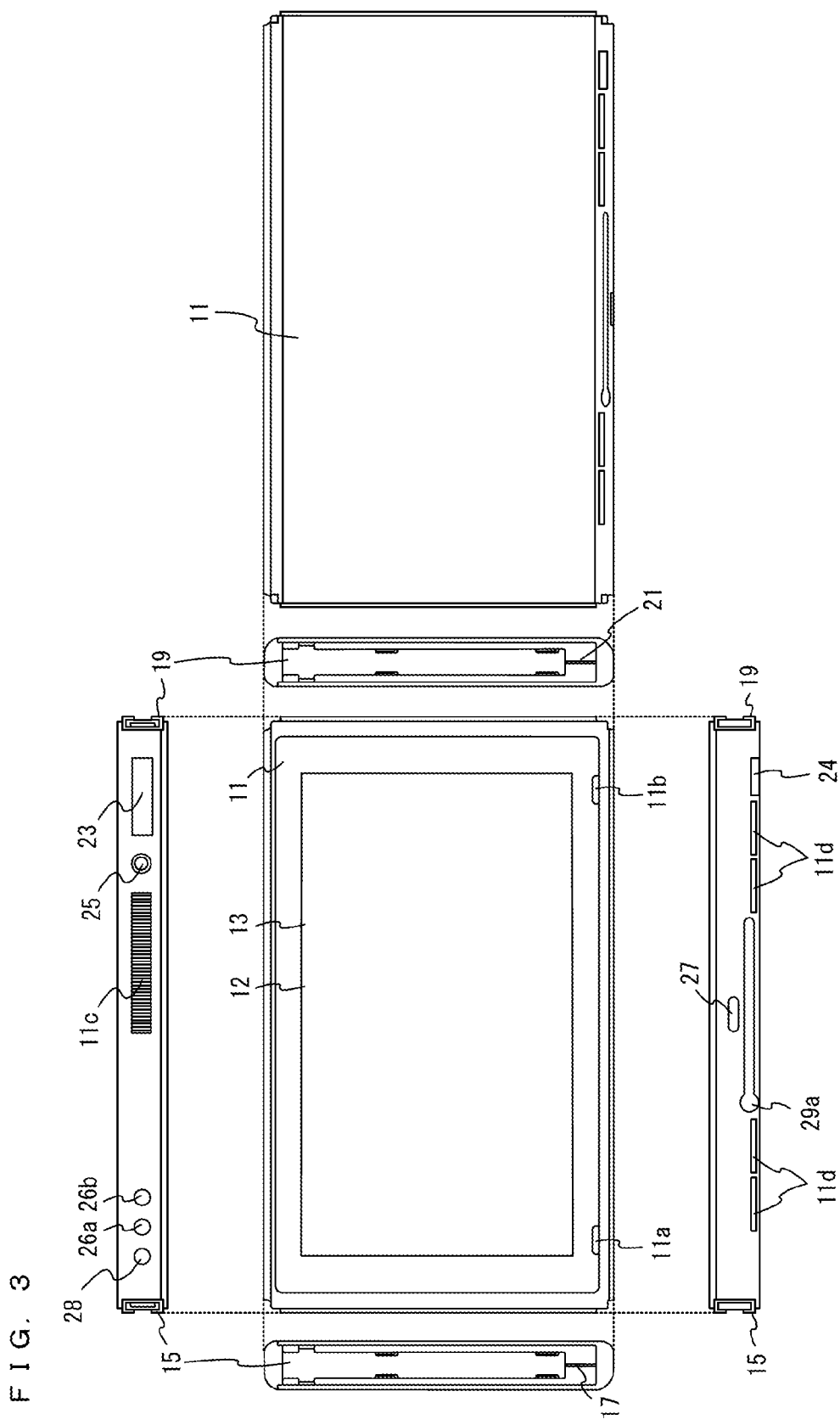
FIG. 3 provides six orthogonal views showing a non-limiting example of the main body apparatus 2.

FIG. 3 provides six orthogonal views showing an example of the main body apparatus 2. As shown in FIG. 3, the main body apparatus 2 includes a generally plate-shaped housing 11. In the exemplary embodiment, a main surface of the housing 11 (in other words, a front surface, i.e., a surface on which the display 12 is provided) has a roughly rectangular shape. In the exemplary embodiment, the housing 11 is longer in a left-right direction as described below. In the exemplary embodiment, a longer direction of the main surface of the housing 11 (i.e., x-axis direction shown in FIG. 1) will be referred to as a "width direction" (also referred to as the "left-right direction"), and a short direction of the main surface (i.e., y-axis direction shown in FIG. 1) will be referred to as a "length direction" (also referred to as an "up-down direction"). A direction perpendicular to the main surface (i.e., z-axis direction shown in FIG. 1) will be referred to as a "depth direction" (also referred to as a "front-rear direction"). The main body apparatus 2 is usable in an orientation in which the width direction extends in the horizontal direction. The main body apparatus 2 is also usable in an orientation in which the length direction extends in the horizontal direction. In this case, the housing 11 may be considered as being longer in the vertical direction.

The housing 11 may have any shape and size. For example, the housing 11 may have a mobile size. A single body of the main body apparatus 2, or an integrated apparatus including the main body apparatus 2 and the left and right controllers 3 and 4 attached thereto, may act as a mobile apparatus. Alternatively, the main body apparatus 2 or the integrated apparatus may act as a handheld apparatus. Still alternatively, the main body apparatus 2 or the integrated apparatus may act as a portable apparatus.

As shown in FIG. 3, the main body apparatus 2 includes the display 12 provided on the main surface of the housing 11. The display 12 displays an image (a still image or a moving image) acquired or generated by the main body apparatus 2. In the exemplary embodiment, the display 12 is a liquid crystal display device (LCD). Alternatively, the display 12 may be a display device of any type.

The main body apparatus 2 includes a touch panel 13 provided on a screen of the display 12. In the exemplary embodiment, the touch panel 13 is of a type that allows a multi-touch input to be made (e.g., of an electrostatic capacitance type). Alternatively, the touch panel 13 may be of any type. For example, the touch panel 13 may be of a type that allows a single-touch input to be made (e.g., of a resistive type).

The main body apparatus 2 includes speakers (speakers 88 shown in FIG. 6) accommodated in the housing 11. As shown in FIG. 3, the main surface of the housing 11 has speaker holes 11a and 11b formed therein. The speakers 88 output a sound through the speaker holes 11a and 11b.

As shown in FIG. 3, the main body apparatus 2 includes a left rail member 15 provided on the left side surface of the housing 11. The left rail member 15 is provided to allow the left controller 3 to be detachably attached to the main body apparatus 2. The left rail member 15 extends in the up-down direction on the left side surface of the housing 11. The left rail member 15 is so shaped as to be engageable with a slider in the left controller 3 (slider 40 shown in FIG. 4), and a slide mechanism includes the left rail member 15 and the slider 40. The slide mechanism allows the left controller 3 to be slidably and detachably attached to the main body apparatus 2.

The main body apparatus 2 includes a left terminal 17. The left terminal 17 allows the main body apparatus 2 to communicate with the left controller 3 in a wired manner. The left terminal 17 is provided at a position where, in the case where the left controller 3 is attached to the main body apparatus 2, the left terminal 17 comes into contact with a terminal in the left controller 3 (terminal 42 shown in FIG. 4). The specific position of the left terminal 17 is optional. In the exemplary embodiment, as shown in FIG. 3, the left terminal 17 is provided on a bottom surface of a groove in the left rail member 15. In the exemplary embodiment, the left terminal 17 is provided near a lower end on the bottom surface of the groove of the left rail member 15, more specifically, at a position where the left terminal 17 is not exposed outside by a part of the left rail member 15.

As shown in FIG. 3, components similar to the components provided on the left side surface of the housing 11 are provided on the right side of the housing 11. Specifically, the main body apparatus 2 includes a right rail member 19 provided on the right side surface of the housing 11. The right rail member 19 extends in the up-down direction on the right side surface of the housing 11. The right rail member 19 is so shaped as to be engageable with a slider in the right controller 4 (slider 62 shown in FIG. 5), and a slide mechanism includes the right rail member 19 and the slider 62. The slide mechanism allows the right controller 4 to be slidably and detachably attached to the main body apparatus 2.

The main body apparatus 2 includes a right terminal 21. The right terminal 21 is provided to allow the main body apparatus 2 to communicate with the right controller 4 in a wired manner. The right terminal 21 is provided at a position where, in the case where the right controller 4 is attached to the main body apparatus 2, the right terminal 21 comes into contact with a terminal in the right controller 4 (terminal 64 shown in FIG. 5). The specific position of the right terminal 21 is optional. In the exemplary embodiment, as shown in FIG. 3, the right terminal 21 is provided on a bottom surface of a groove in the right rail member 19. In the exemplary embodiment, the right terminal 21 is provided near a lower end of the bottom surface of the groove of the right rail member 19, more specifically, at a position where the right terminal 21 is not exposed outside by a part of the right rail member 19.

As shown in FIG. 3, the main body apparatus 2 includes a first slot 23. The first slot 23 is provided in an upper side surface of the housing 11. The first slot 23 is so shaped as to allow a first type storage medium to be attached to the first slot 23. The first type storage medium is, for example, a dedicated storage medium (e.g., dedicated memory card) for the information processing system and an information processing apparatus of the same type as that of the information processing system. The first type storage medium is used to, for example, store data usable by the main body apparatus 2 (e.g., saved data of an application or the like) and/or a program executable by the main body apparatus 2 (e.g., program for an application or the like). The main body apparatus 2 includes a power button 28. As shown in FIG. 3, the power button 28 is provided on the upper side surface of the housing 11. The power button 28 is provided to switch the power supply of the main body apparatus 2 between an on-state and an off-state.

The main body apparatus 2 includes a sound input/output terminal (specifically, earphone jack) 25. That is, the main body apparatus 2 allows a microphone or an earphone to be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are provided to give an instruction to adjust the volume of a sound output from the main body apparatus 2. The sound volume button 26a is provided to give an instruction to turn down the sound volume, and the sound volume button 26b is provided to give an instruction to turn up the sound volume.

The housing 11 includes an exhaust hole 11c formed thereon. As shown in FIG. 3, the exhaust hole 11c is formed in the upper side surface of the housing 11. The exhaust hole 11c is formed to exhaust (in other words, release) heat generated inside the housing 11 to outside the housing 11. That is, the exhaust hole 11c may be called a heat discharge hole.

The main body apparatus 2 includes a lower terminal 27. The lower terminal 27 is provided to allow the main body apparatus 2 to communicate with a cradle. As shown in FIG. 3, the lower terminal 27 is provided on a lower side surface of the housing 11. In the case where the main body apparatus 2 is attached to the cradle, the lower terminal 27 is connected to a terminal of the cradle. In the exemplary embodiment, the lower terminal 27 is a USB connector (more specifically, a female connector). Only the main body apparatus 2, with the left controller 3 and the right controller 4 being detached therefrom, may be mounted on the cradle. In another example, the integrated apparatus including the main body apparatus 2 and the left and right controllers 3 and 4 attached thereto may be mounted on the cradle. The cradle is communicable (via wired communication or wireless communication) with a stationary monitor (e.g., stationary TV), which is an example of external display device separate from the main body apparatus 2. In the case where the integrated apparatus or a single body of the main body apparatus 2 is mounted on the cradle, the information processing system displays, on the stationary monitor, an image acquired or generated by the main body apparatus 2. In the exemplary embodiment, the cradle has a function of charging the integrated apparatus or a single body of the main body apparatus 2 mounted thereon. The cradle has a function of a hub apparatus (specifically, a USB hub).

The main body apparatus 2 includes a second slot 24. In the exemplary embodiment, the second slot 24 is provided in the lower side surface of the housing 11. In another exemplary embodiment, the second slot 24 may be provided in the same surface as the first slot 23. The second slot 24 is so shaped as to allow a second type storage medium, different from the first type storage medium, to be attached to the second slot 24. The second type storage medium may be, for example, a general-purpose storage medium. For example, the second type storage medium may be an SD card. Similarly to the first type storage medium, the second type storage medium is used to, for example, store data usable by the main body apparatus 2 (e.g., saved data of an application or the like) and/or a program executable by the main body apparatus 2 (e.g., program for an application or the like).

The housing 11 includes an absorption holes 11*d* formed therein. As shown in FIG. 3, the air absorption holes 11*d* are formed in the lower side surface of the housing 11. The absorption holes 11*d* are formed to absorb (in other words, introduce) air outside the housing 11 into the housing 11. In the exemplary embodiment, the air absorption holes 11*d* are formed in the surface opposite to the surface in which the exhaust hole 11*c* is formed. Thus, heat in the housing 11 is released efficiently.

The shapes, the numbers, and the installation positions of the above-described components provided in the housing 11 (specifically, the buttons, the slots, the terminals, and the like) are optional. For example, in another exemplary embodiment, at least one of the power button 28 and the slots 23 and 24 may be provided on/in another side surface or a rear surface of the housing 11. Alternatively, in another exemplary embodiment, the main body apparatus 2 may not include at least one of the above-described components.

Figure 4:
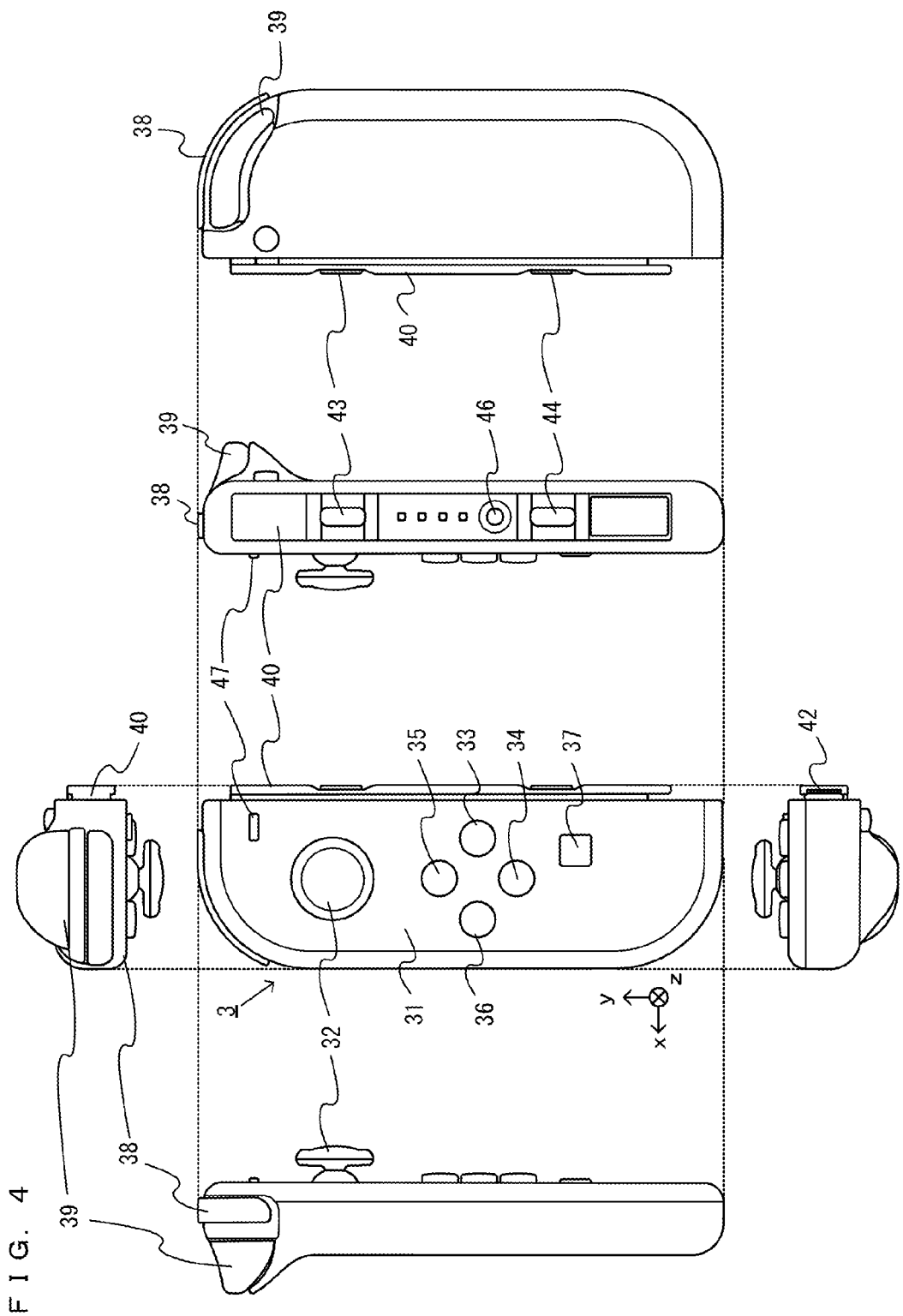
FIG. 4 provides six orthogonal views showing a non-limiting example of the left controller 3.

FIG. 4 provides six orthogonal views showing an example of the left controller 3. As shown in FIG. 4, the left controller 3 includes a housing 31. In the exemplary embodiment, the housing 31 is generally plate-shaped. A main surface of the housing 31 (in other words, a front surface. i.e., a surface on a negative side in the z-axis direction shown in FIG. 1) has a roughly rectangular shape. In the exemplary embodiment, the housing 31 is longer in the up-down direction in FIG. 1A (i.e., in the y-axis direction shown in FIG. 1). In a state of being detached from the main body apparatus 2, the left controller 3 may be held in an orientation in which the longer side extends in the vertical direction. The housing 31 has such a shape and such a size as to be held by one hand, particularly, with the left hand when being held in an orientation in which the longer side extends in the vertical direction. The left controller 3 may also be held in an orientation in which the longer side extends in the horizontal direction. In a case of being held in an orientation in which the longer side extends in the horizontal direction of, the left controller 3 may be held with both of two hands of the user. The housing 31 has any shape. In another exemplary embodiment, the housing 31 may not be generally plate-shaped. The housing 31 may not be rectangular, and may be, for example, semicircular. The housing 31 may not be vertically long.

The length in the up-down direction of the housing 31 is approximately equal to the length in the up-down direction of the housing 11 of the main body apparatus 2. The thickness of the housing 31 (i.e., length in the front-rear direction, in other words, the length in the z-axis direction shown in FIG. 1) is approximately equal to the thickness of the housing 11 of the main body apparatus 2. Thus, in the case where the left controller 3 is attached to the main body apparatus 2 (see FIG. 1), the user can hold the main body apparatus 2 and the left controller 3 with a feeling that he/she holds an integrated apparatus.

As shown in FIG. 4, the main surface of the housing 31 is shaped such that left corners thereof are more rounded than right corners thereof. Specifically, a connection portion between an upper side surface and a left side surface of the housing 31 and a connection portion between a lower side surface and the left side surface of the housing 31 are more rounded (in other words, are chamfered to have a greater roundness) than a connection portion between the upper side surface and a right side surface of the housing 31 and a connection portion between the lower side surface and the right side surface of the housing 31. Thus, in the case where the left controller 3 is attached to the main body apparatus 2 (see FIG. 1), the integrated apparatus has a rounded shape on the left side and thus is easy for the user to hold.

The left controller 3 includes an analog stick 32. As shown in FIG. 4, the analog stick 32 is provided on the main surface of the housing 31. The analog stick 32 is an example of direction input section usable to input a direction. The analog stick 32 includes a stick member that can be inclined in all directions parallel to the main surface of the housing 31 (i.e., 360° directions including up, down, left, right, and oblique directions). The user may incline the stick member to input a direction corresponding to a direction of the inclination (and to input a magnitude corresponding to an angle of the inclination). The direction input section may be a cross key, a slide stick, or the like. In the exemplary embodiment, the stick member may be pressed (in a direction perpendicular to the housing 31) to make an input operation. That is, the analog stick 32 is an input section usable to input a direction and a magnitude corresponding to the direction of inclination and the amount of inclination of the stick member, and also usable to make a press input operation on the stick member.

The left controller 3 includes four operation buttons 33 through 36 (specifically, a right direction button 33, a down direction button 34, an up direction button 35, and a left direction button 36). As shown in FIG. 4, the four operation buttons 33 through 36 are provided below the analog stick 32 on the main surface of the housing 31. In the exemplary embodiment, the four operation buttons are provided on the main surface of the left controller 3. The number of operation buttons is optional. The operation buttons 33 through 36 are used to give instructions corresponding to various programs executable by the main body apparatus 2 (e.g., an OS program and an application program). In the exemplary embodiment, the operation buttons 33 through 36 are usable to input directions, and thus are termed the right direction button 33, the down direction button 34, the up direction button 35, and the left direction button 36. Alternatively, the operation buttons 33 through 36 may be used to give instructions other than directions.

The left controller 3 includes a recording button 37. As shown in FIG. 4, the recording button 37 is provided on the main surface of the housing 31, more specifically, is provided on a lower right area of the main surface. The recording button 37 is used to give an instruction to store an image displayed on the display 12 of the main body apparatus 2. In the case where, for example, a game image is displayed on the display 12, the user may press the recording button 37 to store the game image, displayed at the time when the recording button 37 is pressed, on, for example, a storage section of the main body apparatus 2.

The left controller 3 includes a "−" (minus) button 47. As shown in FIG. 4, the "−" button 47 is provided on the main surface of the housing 31, more specifically, is provided on an upper right area of the main surface. The "−" button 47 is used to give instructions corresponding to various programs executable by the main body apparatus 2 (e.g., an OS program and an application program). The "−" button 47 is used as, for example, a select button in a game application (e.g., as a button used to switch a selectable item).

In the case where the left controller 3 is attached to the main body apparatus 2, the operation sections provided on the main surface of the left controller 3 (specifically, the analog stick 32 and the buttons 33 through 37 and 47) are operated with, for example, the thumb of the left hand of the user holding the integrated apparatus. In the case where the left controller 3 is used while being detached from the main body apparatus 2 and held in a horizontal orientation with both of two hands of the user, the above-described operation sections are operated with, for example, the thumbs of the left and right hands of the user holding the left controller 3. Specifically, in this case, the analog stick 32 is operated with the thumb of the left hand of the user, and the operation buttons 33 through 36 are operated with the thumb of the right hand of the user.

The left controller 3 includes a first L-button 38. The left controller 3 includes a ZL-button 39. Similarly to the operation buttons 33 through 36, the operation buttons 38 and 39 are used to give instructions corresponding to various programs executable by the main body apparatus 2. As shown in FIG. 4, the first L-button 38 is provided on an upper left portion of the side surface of the housing 31. The ZL-button 39 is provided on an upper left portion from the side surface to a rear surface of the housing 31 (more precisely, an upper left portion when the housing 31 is viewed from the front side thereof). That is, the ZL-button 39 is provided to the rear of the first L-button 38 (on a positive side in the z-axis direction shown in FIG. 1). In the exemplary embodiment, the upper left portion of the housing 31 has a rounded shape. Therefore, the first L-button 38 and the ZL-button 39 each have a rounded shape corresponding to the roundness of the upper left portion of the housing 31. In the case where the left controller 3 is attached to the main body apparatus 2, the first L-button 38 and the ZL-button 39 are located on an upper left portion of the integrated apparatus.

The left controller 3 includes the slider 40 described above. As shown in FIG. 4, the slider 40 extends in the up-down direction on the right side surface of the housing 31. The slider 40 is so shaped as to be engageable with the left rail member 15 of the main body apparatus 2 (more specifically, with the groove in the left rail member 15). Thus, the slider 40, when being engaged with the left rail member 15, is secured so as not to be detached in a direction perpendicular to a slide direction (the slide direction is, in other words, the direction in which the left rail member 15 extends).

The left controller 3 includes the terminal 42 usable by the left controller 3 to communicate with the main body apparatus 2 in a wired manner. The terminal 42 is provided at a position where, in the case where the left controller 3 is attached to the main body apparatus 2, the terminal 42 comes into contact with the left terminal 17 (FIG. 3) of the main body apparatus 2. The specific position of the terminal 42 is optional. In the exemplary embodiment, as shown in FIG. 4, the terminal 42 is provided at a position where the terminal 42 is not exposed outside by an attachment surface to which the slider 40 is attached. In the exemplary embodiment, the terminal 42 is provided near a lower end on the attachment surface of the slider 40.

The left controller 3 includes a second L button 43 and a second R button 44. The buttons 43 and 44 are used to give instructions corresponding to various programs executable by the main body apparatus 2, like the other operation buttons 33 through 36. As shown in FIG. 4, the second L-button 43 and the second R button 44 are provided on the attachment surface to which the slider 40 is attached. The second L button 43 is provided on the attachment surface, more specifically, at a position upper to the center in the up-down direction (y-axis direction shown in FIG. 1). The second R button 44 is provided on the attachment surface, more specifically, at a position lower to the center in the up-down direction. The second L button 43 and the second R button 44 are located at positions where the second L button 43 and the second R button 44 are not pressed in a state where the left controller 3 is attached to the main body apparatus 2. Namely, the second L button 43 and the second R button 44 are usable in a state where the left controller 3 is detached from the main body apparatus 2. The second L button 43 and the second R button 44 are operable by, for example, the index finger or the middle finger of either the left hand or the right hand of the user holding the left controller 3 detached from the main body apparatus 2.

The left controller 3 includes a paring button 46. In the exemplary embodiment, the pairing button 46 is used to give an instruction to perform a setting process on the wireless communication between the left controller 3 and the main body apparatus 2 (such a setting process is also referred to as "pairing"). The pairing button 46 is also used to give an instruction to perform a reset process on the left controller 3. In another embodiment, the pairing button 46 may have a function of giving only an instruction to perform the setting process or an instruction to perform the reset process. In the case where, for example, the pairing button 46 is short-pressed (specifically, in the case where the pairing button 46 is pressed for a time period shorter than a predetermined time period), the left controller 3 executes the above-described setting process. In the case where the pairing button 46 is long-pressed (specifically, in the case where the pairing button 46 is pressed for the predetermined time period or longer), the left controller 3 executes the above-described reset process. In the exemplary embodiment, as shown in FIG. 4, the pairing button 46 is provided on the attachment surface to which the slider 40 is attached. As can be seen, the pairing button 46 is located at a position where the pairing button 46 is not viewed in a state where the left controller 3 is attached to the main body apparatus 2. Namely, the pairing button 46 is used in a state where left controller 3 is detached from the main body apparatus 2.

In the exemplary embodiment, the buttons provided on the attachment surface to which the slider 40 is attached (specifically, the second L button 43, the second R button 44, and the pairing button 46) are provided so as not to protrude from the attachment surface. Namely, top surfaces (in other words, surfaces to be pressed) of the above-mentioned buttons are flush with, or are recessed from, the attachment surface to which the slider 40 is attached. With such a structure, in a state where the slider 40 is attached to the left rail member 15 of the main body apparatus 2, the slider 40 is smoothly slidable with respect to the left rail member 15.

Figure 5:
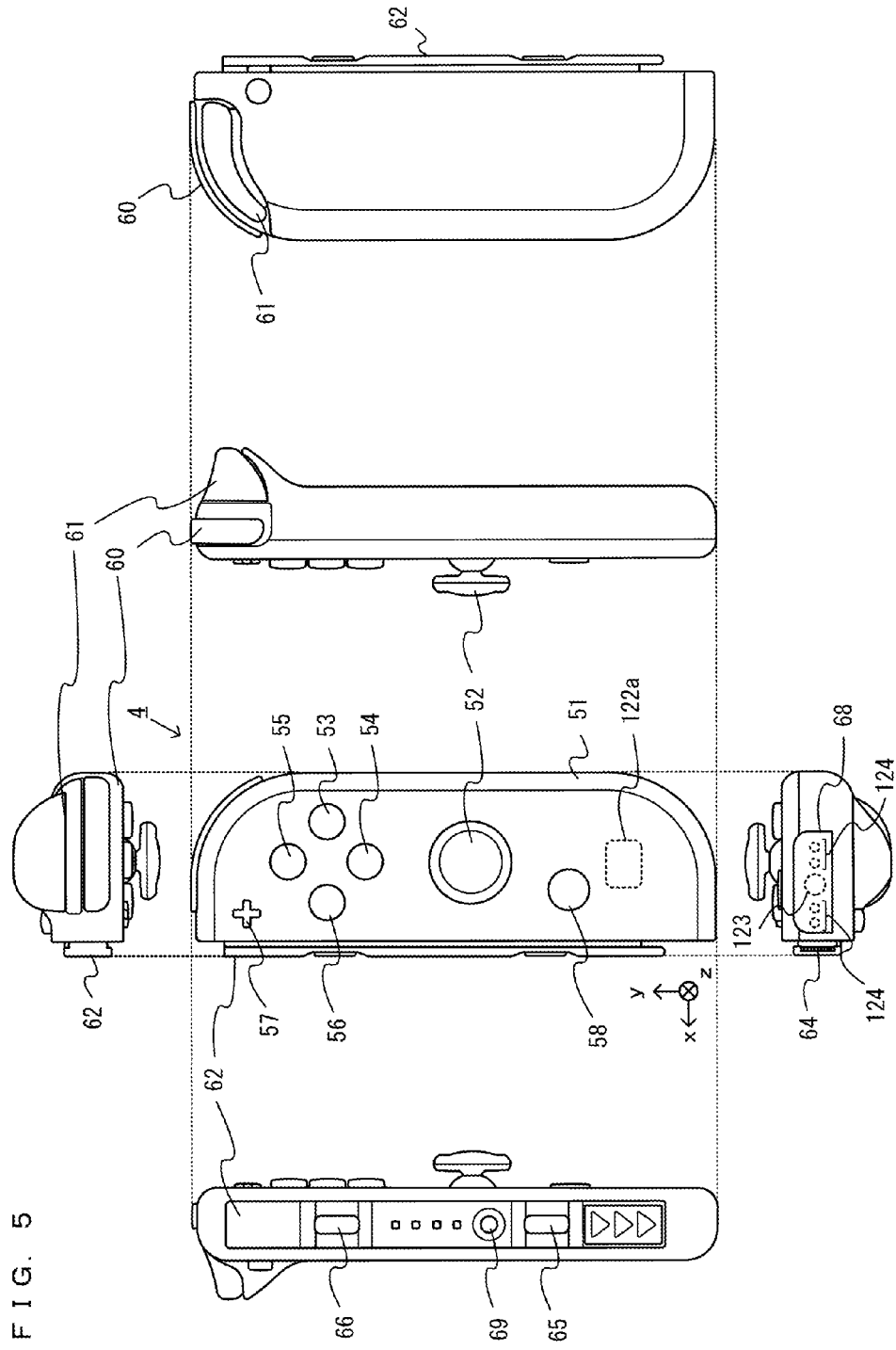
FIG. 5 provides six orthogonal views showing a non-limiting example of the right controller 4.

FIG. 5 provides six orthogonal views showing an example of the right controller 4. As shown in FIG. 5, the right controller 4 includes a housing 51. In the exemplary embodiment, the housing 51 is generally plate-shaped. A main surface of the housing 51 (in other words, a front surface, i.e., a surface on the negative side in the z-axis direction shown in FIG. 1) has a roughly rectangular shape. In the exemplary embodiment, the housing 51 is longer in the up-down direction in FIG. 1A. In a state of being detached from the main body apparatus 2, the right controller 4 may be held in an orientation in which the longer side extends in the vertical direction. The housing 51 has such a shape and such a size as to be held by one hand, particularly, with the right hand when being held in an orientation in which the longer side extends in the vertical direction. The right controller 4 may also be held in an orientation in which the longer side extends in the horizontal direction. In a case of being held in an orientation in which the longer side extends in the horizontal direction, the right controller 4 may be held with both of two hands of the user.

Similarly to the case of the housing 31 of the left controller 3, the length in the up-down direction of the housing 51 of the right controller 4 is approximately equal to the length in the up-down direction of the housing 11 of the main body apparatus 2, and the thickness of the housing 51 is approximately equal to the thickness of the housing 11 of the main body apparatus 2. Thus, in the case where the right controller 4 is attached to the main body apparatus 2 (see FIG. 1), the user can hold the main body apparatus 2 and the right controller 4 with a feeling that he/she holds an integrated apparatus.

As shown in FIG. 5, the main surface of the housing 51 is shaped such that right corners thereof are more rounded than left corners thereof. Specifically, a connection portion between an upper side surface and a right side surface of the housing 51 and a connection portion between a lower side surface and the right side surface of the housing 51 are more rounded (in other words, are chamfered to have a greater roundness) than a connection portion between the upper side surface and a left side surface of the housing 51 and a connection portion between the lower side surface and the left side surface of the housing 51. Thus, in the case where the right controller 4 is attached to the main body apparatus 2 (see FIG. 1), the integrated apparatus has a rounded shape on the right side and thus is easy for the user to hold.

Similarly to the left controller 3, the right controller 4 includes an analog stick 52 as a direction input section. In the exemplary embodiment, the analog stick 52 has the same configuration as that of the analog stick 32 of the left controller 3. Similarly to the left controller 3, the right controller 4 includes four operation buttons 53 through 56 (specifically, an A-button 53, a B-button 54, an X-button 55, and a Y-button 56). In the exemplary embodiment, the four operation buttons 53 through 56 have the same mechanism as that of the four operation buttons 33 through 36 of the left controller 3. As shown in FIG. 5, the analog stick 52 and the operation buttons 53 through 56 are provided on the main surface of the housing 51. In the exemplary embodiment, the four operation buttons are provided on the main surface of the right controller 4. The number of operation buttons is optional.

Now, in the exemplary embodiment, the positional relationship between the two types of operation sections (the analog stick and the operation buttons) of the right controller 4 is opposite to the positional relationship between the corresponding two types of operation sections of the left controller 3. That is, in the right controller 4, the analog stick 52 is located below the operation buttons 53 through 56, whereas in the left controller 3, the analog stick 32 is located above the operation buttons 33 through 36. With such a positional arrangement, the left controller 3 and the right controller 4 are usable with similar operation feelings to each other when being detached from the main body apparatus 2.

The right controller 4 includes a "+" (plus) button 57. As shown in FIG. 5, the "+" button 57 is provided on the main surface of the housing 51, more specifically, is provided on an upper left area of the main surface. Similarly to the other operation buttons 53 through 56, the "+" button 57 is used to give instructions corresponding to various programs executable by the main body apparatus 2 (e.g., an OS program and an application program). The "+" button 57 is used as, for example, a start button in a game application (e.g., as a button used to give an instruction to start a game).

The right controller 4 includes a home button 58. As shown in FIG. 5, the home button 58 is provided on the main surface of the housing 51, more specifically, is provided on a lower left area of the main surface. The home button 58 is used to display a predetermined menu screen on the display 12 of the main body apparatus 2. The menu screen, for example, allows an application, specified by the user from one or more applications executable by the main body apparatus 2, to be started. The menu screen may be displayed, for example, when the main body apparatus 2 is started. In the exemplary embodiment, when the home button 58 is pressed in the state where an application is being executed by the main body apparatus 2 (i.e., in the state where an image of the application is displayed on the display 12), a predetermined operation screen may be displayed on the display 12 (at this point, the menu screen may be displayed instead of the operation screen). The operation screen, for example, allows an instruction to finish the application and display the menu screen on the display 12, an instruction to resume the application, or the like, to be given.

In the case where the right controller 4 is attached to the main body apparatus 2, the operation sections (specifically, the analog stick 52 and the buttons 53 through 58) provided on the main surface of the right controller 4 are operated with, for example, the thumb of the right hand of the user holding the integrated apparatus. In the case where the right controller 4 is used while being detached from the main body apparatus 2 and held in a horizontal orientation with both of two hands of the user, the above-described operation sections are operated with, for example, the thumbs of the left and right hands of the user holding the right controller 4. Specifically, in this case, the analog stick 52 is operated with the thumb of the left hand of the user, and the operation buttons 53 through 56 are operated with the thumb of the right hand of the user.

The right controller 4 includes a first R-button 60. The right controller 4 includes a ZR-button 61. As shown in FIG. 5, the first R-button 60 is provided on an upper right portion of the side surface of the housing 51. The ZR-button 61 is provided on an upper right portion from the side surface to a rear surface of the housing 51 (more precisely, an upper right portion when the housing 51 is viewed from the front side thereof). That is, the ZR-button 61 is provided to the rear of the first R-button 60 (on the positive side in the z-axis direction shown in FIG. 1). In the exemplary embodiment, the upper right portion of the housing 51 has a rounded shape. Therefore, the first R-button 60 and the ZR-button 61 each have a rounded shapes corresponding to the roundness of the upper right portion of the housing 51. In the case where the right controller 4 is attached to the main body apparatus 2, the first R-button 60 and the ZR-button 61 are located on an upper right portion of the integrated apparatus.

The left controller 3 includes a slider mechanism similar to that of the left controller 3. That is, the right controller 4 includes the slider 62 described above. As shown in FIG. 5, the slider 62 extends in the up-down direction on the left side surface of the housing 51. The slider 62 is so shaped as to be engageable with the right rail member 19 of the main body apparatus 2 (more specifically, with the groove in the right rail member 19). Thus, the slider 62, when being engaged with the right rail member 19, is secured so as not to be detached in a direction perpendicular to the slide direction (the slide direction is, in other words, the direction in which the right rail member 19 extends).

The right controller 4 includes the terminal 64 usable by the right controller 4 to communicate with the main body apparatus 2 in a wired manner. The terminal 64 is provided at a position where, in the case where the right controller 4 is attached to the main body apparatus 2, the terminal 64 comes into contact with the right terminal 21 (FIG. 3) of the main body apparatus 2. The specific position of the terminal 64 is optional. In the exemplary embodiment, as shown in FIG. 5, the terminal 64 is provided at a position where the terminal 64 is not exposed outside by an attachment surface to which the slider 62 is attached. In the exemplary embodiment, the terminal 64 is provided near a lower end on the attachment surface of the slider 62.

Like the left controller 3, the right controller 4 includes a second L button 65 and a second R button 66. The buttons 65 and 66 are used to give instructions corresponding to various programs executable by the main body apparatus 2, like the other operation buttons 53 through 56. As shown in FIG. 5, the second L-button 65 and the second R button 66 are provided on the attachment surface to which the slider 62 is attached. The second L button 65 is provided on the attachment surface, more specifically, at a position lower to the center in the up-down direction (y-axis direction shown in FIG. 1). The second R button 66 is provided on the attachment surface, more specifically, at a position upper to the center in the up-down direction. The second L button 65 and the second R button 66 are located at positions where the second L button 65 and the second R button 66 are not pressed in a state where the right controller 4 is attached to the main body apparatus 2, like the second L button 43 and the second R button 44 of the left controller 3. Namely, the second L button 65 and the second R button 66 are usable in a state where the right controller 4 is detached from the main body apparatus 2. The second L button 65 and the second R 66 are operable by, for example, the index finger or the middle finger of either the left hand or the right hand of the user holding the right controller 4 detached from the main body apparatus 2.

The right controller 4 includes a paring button 69. Like the pairing button 46 of the left controller 3, the pairing button 69 is used to give an instruction to perform a setting process on the wireless communication between the right controller 4 and the main body apparatus 2 (such a setting process is also referred to as "pairing"), and also to give an instruction to perform a reset process on the right controller 4. The setting process and the reset process are substantially the same as those executable by the left controller 3, and will not be described in detail. In the exemplary embodiment, as shown in FIG. 5, the pairing button 69 is provided on the attachment surface to which the slider 62 is attached. As can be seen, the pairing button 69 is located at a position where the pairing button 69 is not viewed in a state where the right controller 4 is attached to the main body apparatus 2, for the same reason as described above regarding the left controller 3.

In the right controller 4, like in the left controller 3, the buttons provided on the attachment surface to which the slider 62 is attached (specifically, the second L button 65, the second R button 66, and the pairing button 69) are provided so as not to protrude from the attachment surface. With such a structure, in a state where the slider 62 is attached to the right rail member 19 of the main body apparatus 2, the slider 62 is smoothly slidable with respect to the right rail member 19.

A window 68 is provided in a bottom surface of the housing 51. As described below in detail, the right controller 4 includes an infrared image capturing section 123 and an infrared light emitting section 124 located in the housing 31. The infrared image capturing section 123 captures an image of a region around the right controller 4 via the window 68, with a downward direction with respect to the right controller 4 (negative y-axis direction shown in FIG. 5) being an image capturing direction. The infrared light emitting section 124 irradiates an image capturing target that is to be captured by the infrared image capturing section 123 and is in a predetermined irradiation range centered around the downward direction with respect to the right controller 4 (negative y-axis direction shown in FIG. 5), with infrared light via the window 68. In the example shown in FIG. 5, a plurality of the infrared light emitting sections 124 having different irradiation directions are provided in order to expand the irradiation range to be irradiated by the infrared light emitting section 124. The window 68 is provided to protect the lens of a camera of the infrared image capturing section 123, a light emitting body of the infrared light emitting section 124, and the like, and is formed of a material transmitting light of a wavelength detected by the camera or light emitted by the light emitting body (e.g., formed of a transparent material). The window 68 may be a hole formed in the housing 51. In the exemplary embodiment, the infrared image capturing section 123 itself includes a filter member suppressing transmission of light of a wavelength other than the wavelength of the light detected by the camera (in the exemplary embodiment, infrared light). In another embodiment, the window 68 may have a function of a filter.

As described below in detail, the right controller 4 includes an NFC communication section 122. The NFC communication section 122 performs near field communication based on the NFC (Near Field Communication) protocols. The NFC communication section 122 includes an antenna 122a usable for the near field communication and a circuit generating a signal (radio wave) to be transmitted from the antenna 122a (the circuit is, for example, an NFC chip). For example, the antenna 122a is provided in a bottom portion below the main surface of the housing 51, the bottom portion being close to the lower side surface of the housing 51. The window 68 is provided in the lower side surface of the housing 51. In the case where another wireless communication device (e.g., NFC tag acting as an information storage medium) that becomes a target of the near field communication is located at a position close to, or in contact with, the bottom portion, the antenna 122a is located in the housing 51, more specifically, at a position where the antenna 122a is capable of performing the near field communication with the wireless communication device. The near field communication is not limited to being based on the NFC protocols, and may any type of near field communication (contactless communication). The near field communication encompasses, for example, a communication system by which a radio wave from one device generates an electromotive force in another device (the electromotive force is generated by, for example, electromagnetic induction).

Regarding the left controller 3 and the right controller 4, the shapes, the numbers, and the installation positions of the above-described components provided in the housings 31 and 51 (specifically, the sliders, the sticks, the buttons, and the like) are optional. For example, in another exemplary embodiment, the left controller 3 and the right controller 4 may each include a direction input section of a type different from that of the analog stick. The slider 40 or 62 may be located at a position corresponding to the position of the rail member 15 or 19 provided in the main body apparatus 2, for example, on the main surface or the rear surface of the housing 31 or 51. In still another exemplary embodiment, the left controller 3 and the right controller 4 may not include at least one of the above-described components.

Figure 6:
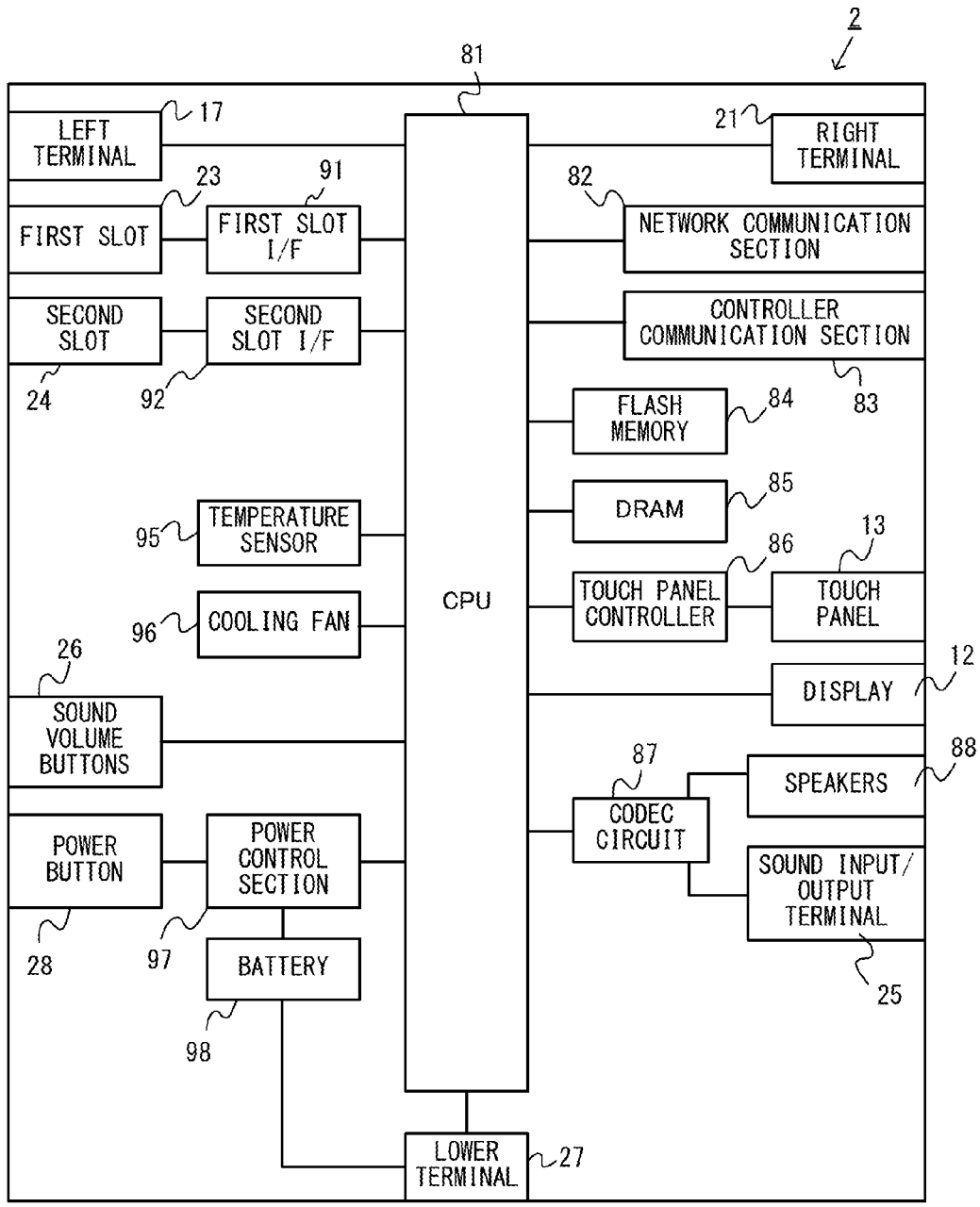
FIG. 6 is a block diagram showing a non-limiting example of internal structure of the main body apparatus 2.

FIG. 6 is a block diagram showing an example of internal configuration of the main body apparatus 2. The main body apparatus 2 includes components 81 through 98 shown in FIG. 6 in addition to the components shown in FIG. 3. At least one of the components 81 through 98 may be mounted as an electronic component on an electronic circuit board and accommodated in the housing 11.

The main body apparatus 2 includes a CPU (Central Processing Unit) 81. The CPU 81 is an information processing section that executes various types of information process executable by the main body apparatus 2. The CPU 81 executes an information processing program (e.g., a game program or a letter input program) stored on a storage section (specifically, an internal storage medium such as a flash memory 84 or the like, an external storage medium attached to each of the slots 23 and 24, or the like) to execute various types of information process.

The main body apparatus 2 includes the flash memory 84 and the DRAM (Dynamic Random Access Memory) 85 as examples of internal storage medium built in the main body apparatus 2. The flash memory 84 and the DRAM 85 are connected with the CPU 81. The flash memory 84 is mainly usable to store various pieces of data (or programs) to be saved on the main body apparatus 2. The DRAM 85 is usable to temporarily store various pieces of data used for the information process.

The main body apparatus 2 includes a first slot interface (hereinafter, the "interface" will be abbreviated as "I/F") 91. The main body apparatus 2 includes a second slot I/F 92. The first slot I/F 91 and the second slot I/F 92 are connected with the CPU 81. The first slot I/F 91 is connected with the first slot 23, and follows an instruction from the CPU 81 to read and write data from and to the first type storage medium (e.g., SD card) attached to the first slot 23. The second slot I/F 92 is connected with the second slot 24, and follows an instruction from the CPU 81 to read and write data from and to the second type storage medium (e.g., dedicated memory card) attached to the second slot 24.

The CPU 81 appropriately transfers data between the flash memory 84/the DRAM 85 and the above-described storage mediums to execute the above-described information process.

The main body apparatus 2 includes a network communication section 82. The network communication section 82 is connected with the CPU 81. The network communication section 82 communicates (specifically, via wireless communication) with an external apparatus via a network. In the exemplary embodiment, in a first communication form, the network communication section 82 is connected with a wireless LAN by a system compliant with the Wi-Fi standards to communicate with an external apparatus. In a second communication form, the network communication section 82 wirelessly communicates with another main body apparatus 2 of the same type by a predetermined communication system (e.g., communication based on an original protocol or infrared light communication). The wireless communication in the second communication form may be performed with another main body apparatus 2 located in a closed local network area and thus realizes a so-called "local communication", in which a plurality of the main body apparatuses 2 are communicated directly to each other to transmit and receive data.

The main body apparatus 2 includes a controller communication section 83. The controller communication section 83 is connected with the CPU 81. The controller communication section 83 wirelessly communicates with the left controller 3 and/or the right controller 4. The communication system between the main body apparatus 2 and the left controller 3 or the right controller 4 is optional. In the exemplary embodiment, the controller communication section 83 performs communication compliant with the Bluetooth (registered trademark) standards with the left controller 3 and with the right controller 4.

The CPU 81 is connected with the left terminal 17, the right terminal 21, and the lower terminal 27. When communicating with the left controller 3 in a wired manner, the CPU 81 transmits data to the left controller 3 via the left terminal 17 and also receives operation data from the left controller 3 via the left terminal 17. When communicating with the right controller 4 in a wired manner, the CPU 81 transmits data to the right controller 4 via the right terminal 21 and also receives operation data from the right controller 4 via the right terminal 21. When communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. In the case where the integrated apparatus including the main body apparatus 2 and the left and right controllers 3 and 4 attached thereto, or a single body of the main body apparatus 2, is attached to the cradle, the main body apparatus 2 outputs data (e.g., image data or sound data) to the stationary monitor or the like by the cradle.

The main body apparatus 2 can communicate with a plurality of the left controllers 3 simultaneously (in other words, in parallel). The main body apparatus 2 can communicate with a plurality of the right controllers 4 simultaneously (in other words, in parallel). Thus, the user can input data to the main body apparatus 2 using the plurality of left controllers 3 and the plurality of right controllers 4.

The main body apparatus 2 includes a touch panel controller 86, which is a circuit that controls the touch panel 13. The touch panel controller 86 is connected between the touch panel 13 and the CPU 81. Based on a signal from the touch panel 13, the touch panel controller 86 generates data indicating, for example, the position where a touch input has been provided. Then, the touch panel controller 86 outputs the data to the CPU 81.

The display 12 is connected with the CPU 81. The CPU 81 displays, on the display 12, an generated image (e.g., image generated by executing the above-described information process) and/or an externally acquired image.

The main body apparatus 2 includes a codec circuit 87 and the speakers (specifically, a left speaker and a right speaker) 88. The codec circuit 87 is connected with the speakers 88 and the sound input/output terminal 25 and also connected with the CPU 81. The codec circuit 87 controls the input and output of sound data to and from the speakers 88 and the sound input/output terminal 25. Specifically, when receiving sound data from the CPU 81, the codec circuit 87 performs D/A conversion on the sound data and outputs a resultant sound signal to the speakers 88 or the sound input/output terminal 25. As a result, a sound is output from the speakers 88 or a sound output section (e.g., earphone) connected with the sound input/output terminal 25. When receiving a sound signal from the sound input/output terminal 25, the codec circuit 87 performs A/D conversion on the sound signal and outputs resultant sound data in a predetermined format to the CPU 81. The sound volume buttons 26 are connected with the CPU 81. Based on an input to the sound volume buttons 26, the CPU 81 controls the volume of the sound to be output from the speakers 88 or the sound output section.

The main body apparatus 2 includes a power control section 97 and a battery 98. The power control section 97 is connected with the battery 98 and the CPU 81. Although not shown in FIG. 8, the power control section 97 is connected with various components of the main body apparatus 2 (specifically, components that receive power supplied from the battery 98, the left terminal 17, and the right terminal 21). Based on a command from the CPU 81, the power control section 97 controls the supply of power from the battery 98 to the above-mentioned components. The power control section 97 is connected with the power button 28. Based on an input to the power button 28, the power control section 97 controls the supply of power to the above-mentioned components. Specifically, in the case where an operation of turning off the power supply is performed on the power button 28, the power control section 97 stops the supply of power to all or a part of the above-mentioned components. In the case where an operation of turning on the power supply is performed on the power button 28, the power control section 97 starts the supply of power to all or a part of the above-mentioned components. The power control section 97 outputs, to the CPU 81, information indicating an input to the power button 28 (specifically, information indicating whether or not the power button 28 has been pressed).

The battery 98 is connected with the lower terminal 27. In the case where an external charging apparatus (e.g., cradle) is connected with the lower terminal 27 and power is supplied to the main body apparatus 2 via the lower terminal 27, the battery 98 is charged with the supplied power.

The main body apparatus 2 includes a cooling fan 96 usable to release heat inside the main body apparatus 2. The cooling fan 96 is operated to introduce air outside the housing 11 through the absorption holes 11d and also to release air inside the housing 11 through the exhaust hole 11c, so that heat inside the housing 11 is released. The cooling fan 96 is connected with the CPU 81, and the operation of the cooling fan 96 is controlled by the CPU 81. The main body apparatus 2 includes a temperature sensor 95, which detects the temperature inside the main body apparatus 2. The temperature sensor 95 is connected with the CPU 81, and a detection result provided by the temperature sensor 95 is output to the CPU 81. Based on the detection result provided by the temperature sensor 95, the CPU 81 controls the operation of the cooling fan 96.

FIG. 7 is a block diagram showing an example of internal configuration of the main body apparatus 2, the left controller 3 and the right controller 4. The components of the main body apparatus 2 are shown in detail in FIG. 6 and thus are omitted in FIG. 7.

The left controller 3 includes a communication control section 101, which communicates with the main body apparatus 2. As shown in FIG. 7, the communication control section 101 is connected with components including the terminal 42. In the exemplary embodiment, the communication control section 101 can communicate with the main body apparatus 2 by wired communication via the terminal 42 and also by wireless communication with no use of the terminal 42. The communication control section 101 controls a method of communication performed by the left controller 3 with the main body apparatus 2. In in the case where the left controller 3 is attached to the main body apparatus 2, the communication control section 101 communicates with the main body apparatus 2 via the terminal 42. In the case where the left controller 3 is detached from the main body apparatus 2, the communication control section 101 wirelessly communicates with the main body apparatus 2 (specifically, the controller communication section 83). The wireless communication between the controller communication section 83 and the communication control section 101 is performed in conformity to, for example, the Bluetooth (registered trademark) standards.

The left controller 3 includes a memory 102 such as, for example, a flash memory or the like. The communication control section 101 includes, for example, a microcomputer (or a microprocessor) and executes firmware stored on the memory 102 to perform various types of process.

The left controller 3 includes buttons 103 (specifically, the buttons 33 through 39, 43, 44 and 46). The left controller 3 includes the analog stick ("stick" in FIG. 7) 32. The buttons 103 and the analog stick 32 each output information regarding an operation performed thereon to the communication control section 101 repeatedly at appropriate timing.

The left controller 3 includes an acceleration sensor 104. In the exemplary embodiment, the acceleration sensor 104 detects magnitudes of linear accelerations in predetermined three axis directions (e.g., x-, y- and z-axis directions shown in FIG. 4). The acceleration sensor 104 may detect an acceleration in one axis direction or accelerations in two axis directions. The left controller 3 includes an angular velocity sensor 105. In the exemplary embodiment, the angular velocity sensor 105 detects angular velocities about predetermined three axes (e.g., x-, y- and z-axes shown in FIG. 4). The angular velocity sensor 105 may detect an angular velocity about one axis or angular velocities about two axes. The acceleration sensor 104 and the angular velocity sensor 105 are connected with the communication control section 101. Detection results provided by the acceleration sensor 104 and the angular velocity sensor 105 are each output to the communication control section 101 repeatedly at appropriate timing.

The communication control section 101 acquires information regarding an input (specifically, information regarding an operation or a detection result provided by any of the sensors) from each of the input sections (specifically, the buttons 103, the analog stick 32, and the sensors 104 and 105). The communication control section 101 transmits, to the main body apparatus 2, operation data including the acquired information (or information obtained by performing a predetermined process on the acquired information). The operation data is transmitted repeatedly at a rate of once every predetermined time period. The interval at which information regarding an input is transmitted to the main body apparatus 2 may or may not be the same among the input sections.

The above-mentioned operation data is transmitted to the main body apparatus 2, so that the main body apparatus 2 obtains the inputs provided to the left controller 3. That is, the main body apparatus 2 distinguishes operations made on the buttons 103 and the analog stick 32 from each other, based on the operation data. The main body apparatus 2 computes information regarding the motion and/or the attitude of the left controller 3 based on the operation data (specifically, the detection results provided by the acceleration sensor 104 and the angular velocity sensor 105).

The left controller 3 includes a vibrator 107 usable to give notification to the user by a vibration. In the exemplary embodiment, the vibrator 107 is controlled by a command from the main body apparatus 2. Specifically, upon receipt of the above-mentioned command from the main body apparatus 2, the communication control section 101 drives the vibrator 107 in accordance with the command. The left controller 3 includes an amplifier 106. Upon receipt of the above-mentioned command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. As a result, the vibrator 107 is operated.

The left controller 3 includes a power supply section 108. In the exemplary embodiment, the power supply section 108 includes a battery and a power control circuit. Although not shown in FIG. 9, the power control circuit is connected with the battery and also connected with components of the left controller 3 (specifically, components that receive power supplied from the battery). The power control circuit controls the supply of power from the battery to the above-mentioned components. The battery is connected with the terminal 42. In the exemplary embodiment, in the case where the left controller 3 is attached to the main body apparatus 2, the battery is charged via the terminal 42 with power supplied from the main body apparatus 2 under a predetermined condition. In the case where the left controller 3 is attached to another device, the battery may supply power to the another device via the terminal 42.

As shown in FIG. 7, the right controller 4 includes a communication control section 111, which communicates with the main body apparatus 2. The right controller 4 includes a memory 112, which is connected with the communication control section 111. The communication control section 111 is connected with components including the terminal 64. The communication control section 111 and the memory 112 have functions similar to those of the communication control section 101 and the memory 102, respectively, of the left controller 3. Thus, the communication control section 111 can communicate with the main body apparatus 2 by wired communication via the terminal 64 and also by wireless communication with no use of the terminal 64 (specifically, communication compliant with the Bluetooth®. The communication control section 111 controls a method of communication performed by the right controller 4 with the main body apparatus 2.

The right controller 4 includes input sections similar to the input sections of the left controller 3 (specifically, buttons 113, the analog stick 52, an acceleration sensor 114, and an angular velocity sensor 115). These input sections have functions similar to those of the input sections of the left controller 3 and operate similarly to the input sections of the left controller 3.

The right controller 4 includes a vibrator 117 and an amplifier 116. The vibrator 117 and the amplifier 116 operate similarly to the vibrator 107 and the amplifier 106, respectively, of the left controller 3. Specifically, the communication control section 111, in accordance with a command from the main body apparatus 2, uses the amplifier 116 to cause the vibrator 117 to operate.

The right controller 4 includes a power supply section 118. The power supply section 118 has a function similar to that of the power supply section 108 of the left controller 3, and operates similarly to the power supply section 108. That is, the power supply section 118 controls the supply of power to components that receive power supplied from a battery. In the case where the right controller 4 is attached to the main body apparatus 2, the battery is charged via the terminal 64 with power supplied from the main body apparatus 2 under a predetermined condition. In the case where the right controller 4 is attached to another device (e.g., the extended input device 200), the battery may supply power to the another device via the terminal 64.

The right controller 4 includes the NFC communication section 122 performing near field communication based on the NFC protocols. The NFC communication section 122 has a so-called NFC reader/writer function. In this specification, the term "near field communication" encompasses a communication system by which a radio wave from one device (herein, the right controller 4) generates an electromotive force in another device (herein, device close to the antenna 122a) (the electromotive force is generated by, for example, electromagnetic induction). The another device is capable of operating by the electromotive force, and may or may not include a power source. In the case where the right controller 4 (antenna 122a) and a communication target become close to each other (typically, in the case where the distance between the right controller 4 (antenna 122a) and the communication target becomes several ten centimeter or shorter), the NFC communication section 122 becomes communicable with the communication target. The communication target is any device capable of performing near field communication with the NFC communication section 122, and is, for example, an NFC tag or a storage medium having a function of an NFC tag. It should be noted that the communication target may be another device having an NFC card emulation function. For example, in the exemplary embodiment, the NFC communication section 122 may perform wireless communication with the communication target attached to the inside of the extended input device 200 (e.g., NFC tag) to acquire a type, identification information, calibration information, user information or the like of the extended input device 200.

The right controller 4 includes the infrared image capturing section 123. The infrared image capturing section 123 includes an infrared camera capturing an image of a region around the right controller 4. In the exemplary embodiment, the infrared image capturing section 123 is used to capture an image of an image capturing target located inside the extended input device 200 (e.g., an image of infrared light emitted by an infrared LED (Light Emitting Diode)). The main body apparatus 2 and/or the right controller 4 calculates information on the image capturing target, an image of which is captured (the information is, for example, the average luminance, the area size, the center-of-gravity coordinate, etc. of the image capturing target), and distinguishes the content of operation made on the extended input device 200 based on the information. The infrared image capturing section 123 may capture an image with environmental light or in a dark place, but in the exemplary embodiment, includes the infrared light emitting section 124 emitting infrared light. The infrared light emitting section 124 directs infrared light in synchronization with, for example, the timing when the infrared camera captures an image. The infrared light emitted by the infrared light emitting section 124 is reflected and received by the infrared image capturing section 123. Thus, an image of the infrared light may be acquired. The infrared image capturing section 123 and the infrared light emitting section 124 may provided in the right controller 4 as separate components, or may be provided in the right controller 4 as a single device in one package. In the exemplary embodiment, the infrared image capturing section 123 includes the infrared camera. In another embodiment, a camera that captures an image of light of a different wavelength (e.g., visible light camera including a visible light image sensor) may be used as an image capturing element, instead of the infrared camera.

The right controller 4 includes a processing section 121. The processing section 121 is connected with the communication control section 111 and is also connected with the NFC communication section 122. The processing section 121, in accordance with a command from the main body apparatus 2, performs a process of managing the NFC communication section 122. For example, the processing section 121 controls an operation of the NFC communication section 122 in accordance with a command from the main body apparatus 2. The processing section 121 controls the start of the NFC communication section 122 or controls an operation of the NFC communication section 122 (specifically, reading, writing, or the like) made on a communication target thereof (e.g., NFC tag). The processing section 121 receives, from the main body apparatus 2, information to be transmitted to the communication target via the communication control section 111 and passes the information to the NFC communication section 122. The processing section 121 also acquires, via the NFC communication section 122, information received from the communication target and transmits the information to the main body apparatus 2 via the communication control section 111.

The processing section 121 includes a CPU, a memory and the like, and executes a management process on the infrared image capturing section 123 in response to an instruction from the main body apparatus 2, based on a predetermined program (e.g., application program for executing an image process or various computations) stored on a storage device (not shown; e.g., nonvolatile memory, hard disc, etc.) included in the right controller 4. For example, the processing section 121 causes the infrared image capturing section 123 to perform an image capturing operation, or acquires and/or calculates information based on the image capturing result (information on the captured image, information calculated from the information, etc.) and transmits the information based on the image capturing result to the main body apparatus 2 via the communication control section 111. The processing section 121 also executes a management process on the infrared light emitting section 124 in response to an instruction from the main body apparatus 2. For example, the processing section 121 controls the light emission of the infrared light emitting section 124 in response to an instruction from the main body apparatus 2. The memory used by the processing section 121 for performing processes may be provided in the processing section 121 or may be the memory 112.

Now, with reference to FIG. 8, a user input made by use of the extended input device 200 will be described. FIG. 8 shows an example of state where a user makes a letter input by use of the extended input device 200. In the exemplary embodiment, the right controller 4 is attachable to the extended input device 200. Based on data transmitted from the right controller 4 attached to the extended input device 200, a process in accordance with the content of operation made on the extended input device 200 is executed. As described below in detail, the content of operation made on the extended input device 200 is detected based on a captured image that is captured by the infrared image capturing section 123. Therefore, the extended input device 200 does not need to include an electric component such as an electronic circuit or the like that transmits the result of the detection of the input or the operation made by the user to the main body apparatus 2. For this reason, in the exemplary embodiment, the structure of the extended input device 200 is simplified.

For example, in the exemplary embodiment, as shown in FIG. 8, the extended input device 200 is a keyboard-type input device including a plurality of input keys 205. The user selects any one of the input keys 205 of the extended input device 200 and makes a touch operation or a press operation on the selected input key 205 with his/her finger. As a result, a letter corresponding to the operated input key 205 is input, a display object (e.g., a cursor) is moved in accordance with the operated input key 205, or a user instruction in accordance with the operated input key 205 is followed. Such a result of the input is displayed on the display device (e.g., the display 12 of the main body apparatus 2). A game in which a player object located in a virtual space makes a motion may be performed, or various types of information may be displayed, in accordance with an operation made by use of the extended input device 200. In the exemplary embodiment, a so-called keyboard may be used to make a user input to perform various processes.

Figure 9:
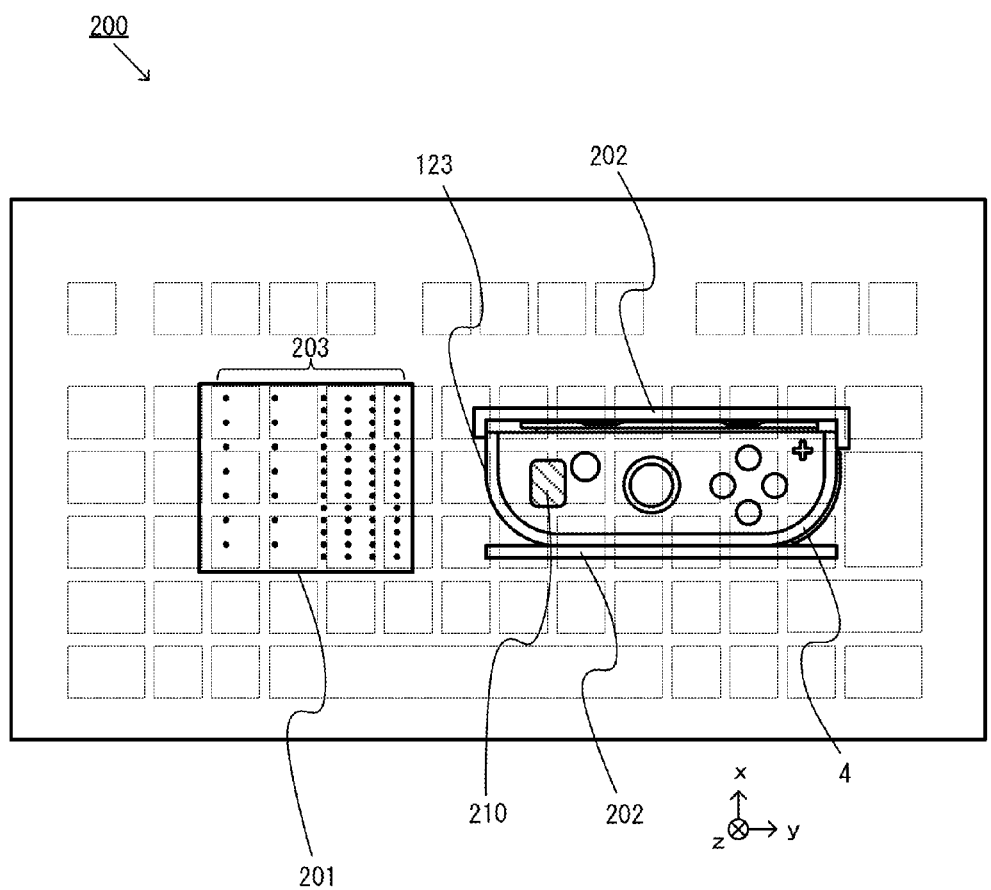
FIG. 9 shows a non-limiting example of a light emitting portion 201 and a securing portion 202 provided inside the extended input device 200 and the right controller 4 attached to the inside of the extended input device 200.
Figure 10:
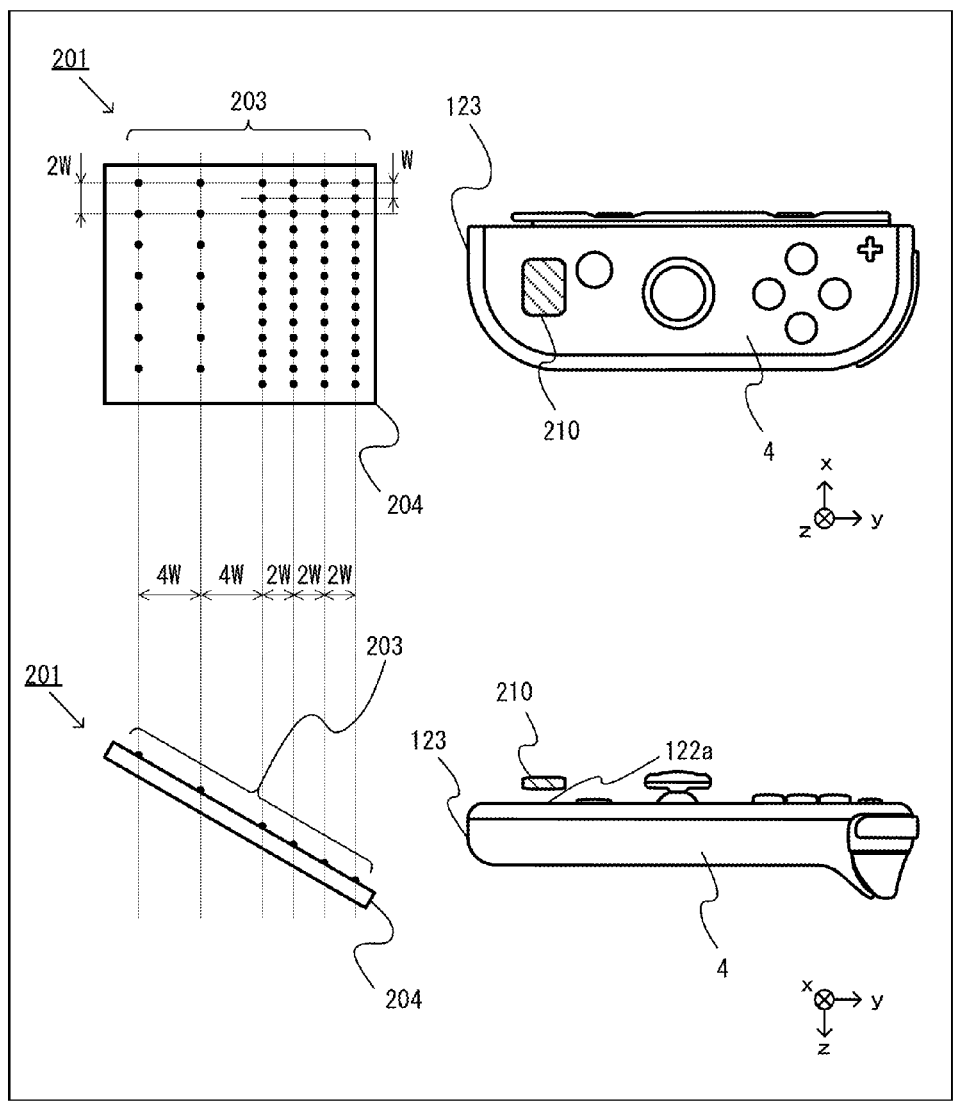
FIG. 10 shows a non-limiting example of positional relationship between the light emitting portion 201 and the right controller 4 shown in FIG. 9.
Figure 11:
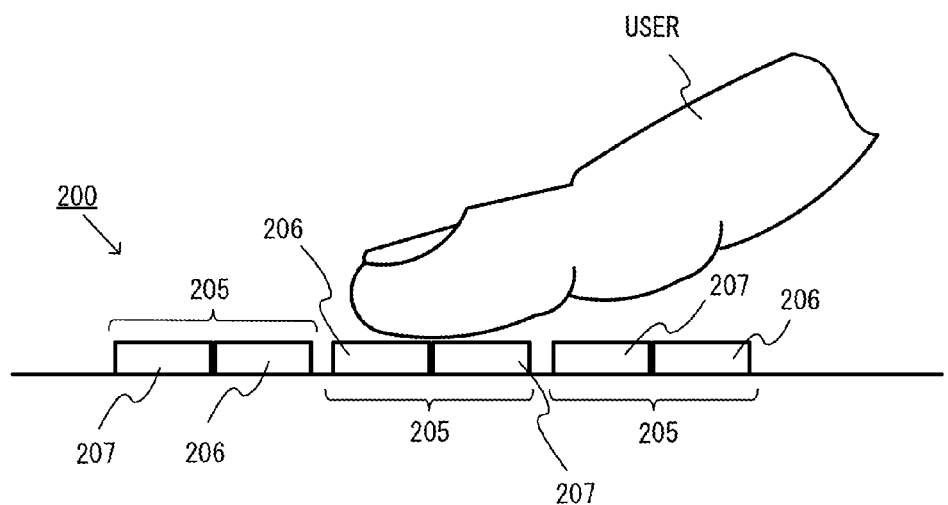
FIG. 11 shows a non-limiting example of structure of input keys 205 of the extended input device 200.
Figure 12:
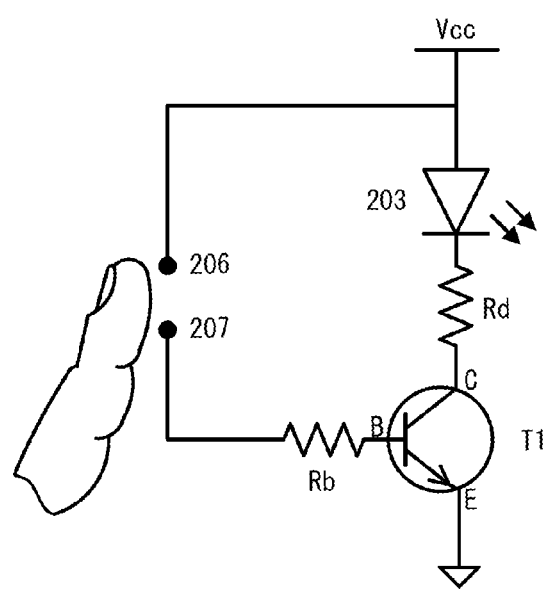
FIG. 12 shows a non-limiting example of circuit causing an infrared LED 203 to emit light in accordance with an input operation made on the input key 205.

Now, with reference to FIG. 9 through FIG. 13, an internal structure of the extended input device 200 will be described. FIG. 9 shows an example of a light emitting portion 201 and a securing portion 202 provided inside the extended input device 200 and the right controller 4 attachable to the inside of the extended input device 200. FIG. 10 shows an example of positional relationship between the light emitting portion 201 and the right controller 4 shown in FIG. 9. FIG. 11 shows an example of structure of the input keys 205 of the extended input device 200. FIG. 12 shows an example of circuit causing an infrared LED 203 to emit light in accordance with an input operation made on the input key 205. FIG. 13 shows another example of circuit causing the infrared LED 203 to emit light in accordance with an input operation made on the input key 205.

As shown in FIG. 9, the light emitting portion 201 and the securing portion 202 are provided in an inner space of the extended input device 200. The securing portion 202 allows the right controller 4 to be secured in the inner space of the extended input device 200 (or the extended input device 200 is secured to the right controller 4). In the example shown in FIG. 9, the secured portion 202 detachably secures the right controller 4 as follows: the right controller 4 is located such that the top surface (main surface) of the right controller 4 is provided on the side of the top surface of the extended input device 200 on which the input keys 205 are provided and such that an inner top surface of the extended input device 200 and the top surface of the right controller 4 face each other. The light emitting portion 201 includes at least one infrared LED 203 (in the example of FIG. 9, a plurality of infrared LEDs 203), and is secured in the inner space of the extended input device 200 such that the infrared image capturing section 123 of the right controller 4 secured to the securing portion 202 is capable of capturing an image of all the infrared LEDs 203. Namely, in the case where the right controller 4 is attached to the securing portion 202, the light emitting portion 201 is located in the negative y-axis direction of the right controller 4, which is the image capturing direction of the infrared image capturing section 123.

As shown in FIG. 10, the light emitting portion 201 includes the plurality of infrared LEDs 204 secured to a surface of a securing plate 204, and the securing plate 204 is secured in the inner space of the extended input device 200 in an inclined state. The "inclined state" refers to that the surface of the securing plate 204, to which the plurality of infrared LEDs 203 are secured, is directed toward the top surface of the extended input device 200 and the infrared image capturing section 123 and is oblique with respect to the top surface of the extended input device 200 and the image capturing direction of the infrared image capturing section 123. The securing plate 204 having the plurality of infrared LEDs 203 secured to the surface thereof is secured in such an inclined state, so that the securing plate 204 has the surface thereof directed toward the infrared image capturing section 123 while being allowed to have a small size in an up-down direction of the extended input device 200. In this manner, the surface of the securing plate 204 having the plurality of infrared LEDs 203 secured thereto faces the infrared image capturing section 123 of the right controller 4 attached to the securing portion 202. Therefore, in a state where the right controller 4 is attached to the securing portion 202, the infrared image capturing section 123 is capable of capturing an image of the plurality of infrared LEDs 203.

The plurality of infrared LEDs 203 may be arrayed in a matrix on the surface of the securing plate 204. Alternatively, as shown in FIG. 10, a left-right interval and a front-rear interval between the plurality of infrared LEDs 203 may be adjusted in accordance with the area in which the infrared LEDs 203 are located. In the example shown in FIG. 10, the infrared LEDs 203 located in the foremost row, which is the closest row to the infrared image capturing section 123, are arrayed with a left-right interval of distance W. The infrared LEDs 203 located in a front area, which is relatively close to the infrared image capturing section 123, are arrayed with a front-rear interval of distance 2 W (e.g., the infrared LEDs 203 in the foremost row and the infrared LEDs 203 in the next row to the rear of the foremost row are arrayed with a front-rear interval of distance 2 W). The infrared LEDs 203 located in a row in a rear area, which is relatively far from the infrared image capturing section 123, are arrayed with a left-right interval of distance 2 W. The infrared LEDs 203 located in the rear area are arrayed with a front-rear interval of distance 4 W (e.g., the infrared LEDs 203 in the rearmost row and the infrared LEDs 203 in the next row to the front of the rearmost row are arrayed with a front-rear interval of distance 4 W). In this manner, in the example of FIG. 10, the infrared LEDs 203 are arrayed with a larger front-rear interval and a larger left-right interval in the rear area than in the front area. The interval between the infrared LEDs are changed in this manner, so that even infrared light rays emitted by the infrared LEDs adjacent to each other and located far from the infrared image capturing section 123 are prevented from crossing each other. Thus, the infrared image capturing section 123 is allowed to capture an image of each of the infrared light rays independently. As described below, the plurality of infrared LEDs 203 each emit infrared light in accordance with the input key 205 operated by the user. Even in the case where the resolution of the captured image captured by the infrared image capturing section 123 is insufficient, the infrared light rays emitted by the infrared LEDs 203 far from the infrared image capturing section 123 are accurately distinguished from each other because the infrared LEDs 203 far from the infrared image capturing section 123 are located with a larger interval.

A power source causing the infrared LEDs 203 to emit light may be provided in the extended input device 200, or power may be supplied from the right controller 4 attached to the extended input device 200. In the latter case, a power supply terminal connectable with the terminal 64 of the right controller 4 is provided in the extended input device 200, and the power supply terminal and the terminal 64 are connected with each other when the right controller 4 is attached to the securing portion 202. The power is supplied from the right controller 4 to the components in the extended input device 200 (e.g., the infrared LEDs 203) via the power supply terminal.

As shown in FIG. 10, an NFC tag 210, which is a communication target of the NFC communication section 122, is provided in the vicinity of the securing portion 202 in the inner space of the extended input device 200. For example, in a state where the right controller 4 is attached to the securing portion 202, the NFC tag 210 is provided close to, or in contact with, the antenna 122a of the right controller 4. With this state, the near field communication is made possible between the right controller 4 and the NFC tag 210 upon attachment of the right controller 4 to the securing portion 202. The type, the unique identification information, the calibration information, the user setting information and the like of the extended input device 200 may be stored on the NFC tag 210, so that the reliability and the setting state of the extended input device 200 in which the right controller 4 is attached are checked.

As shown in FIG. 11, the input keys 205 of the extended input device 200 each include two electrodes 206 and 207. The input keys 205 are insulated from each other, and the electrode 206 and the electrode 207 are also insulated from each other. When the user touches a top surface of either one of the input keys 205 with his/her finger, the electrode 206 and the electrode 207 of the input key 205 are made conductive to each other by the finger of the user. The conductive state is detected, and thus the input key 205 operated by the user is detected.

As shown in FIG. 12, the extended input device 200 includes a detection circuit that, upon the electrode 206 and the electrode 207 being made conductive to each other, causes the infrared LED 203 corresponding to the electrode 206 and the electrode 207 to emit infrared light. For example, the detection circuit includes an NPN-type transistor T1. A collector of the NPN-type transistor T1 is connected with a power supply Vcc via the infrared LED 203 and a resistance Rd. A base of the NPN-type transistor T1 is connected with the power supply Vcc via the electrode 206, the electrode 207 and a resistance Rb. An emitter of the NPN-type transistor T1 is grounded. With such a detection circuit, while the electrode 206 and the electrode 207 are insulated from each other, the voltage at the base of the NPN-type transistor T1 is 0. Therefore, no electric current flows from the collector to the emitter of the NPN-type transistor T1, and thus the infrared LED 203 is not turned on. By contrast, when the electrode 206 and the electrode 207 are made conductive to each other via the user's finger, the voltage at the base of the NPN-type transistor T1 is increased to a level corresponding to the conductive state. Therefore, an electric current flows from the collector to the emitter of the NPN-type transistor T1, and thus the infrared LED 203 is turned on. Such a detection circuit may be provided for each of the input keys 205, so that the infrared LED 203 corresponding to the operated input key 205 emits infrared light.

The resistance values of the resistance Rb and the resistance Rd may be adjusted to adjust the amount of light emitted by the infrared LED 203. For example, in the case where the resistance value of the resistance Rd is set to be low, the amount of light emitted by the infrared LED 203 connected with the resistance Rd is increased. For example, the resistance value of the resistance Rd connected with the infrared LED 203 located far from the infrared image capturing section 123 or located far from the look-at point of the infrared image capturing section 123 may be set to be low, so that the infrared light emitted by such an infrared LED 203 is more easily recognizable in the captured image captured by the infrared image capturing section 123.

A general keyboard includes a plurality of input keys representing the same input (e.g., Ctrl key, Shift key, Alt key, Win key, etc.). In the case where the plurality of input keys representing the same input are provided in the extended input device 200, it may be designed that the same infrared LED 203 emits light whichever of these input keys may be operated.

For example, it is assumed that as shown in FIG. 13, two input keys 205 representing the same input respectively include electrodes 206a and 207a, and electrodes 206b and 207b. In this case, the collector of the NPN-type transistor T1 in the detection circuit is connected with power supply Vcc via the infrared LED 203 and the resistance Rd as in the above-described detection circuit. Regarding the base of the NPN-type transistor T1, there are circuits parallel to each other: a circuit by which the base is connected with the power supply Vcc via the electrode 206a, the electrode 207a and the resistance Rb; and a circuit by which the base is connected with the power supply Vcc via the electrode 206b, the electrode 207b and the resistance Rb. The emitter of the NPN-type transistor T1 is grounded as in the above-described detection circuit. With such a detection circuit, in the case where the electrodes 206a and 207a are insulated from each other and also the electrodes 206b and 207b are insulated from each other, the voltage at the base of the NPN-type transistor T1 is 0. Therefore, no electric current flows from the collector to the emitter of the NPN-type transistor T1, and thus the infrared LED 203 is not turned on. By contrast, when at least the electrode 206a and the electrode 207a or the electrode 206b and the electrode 207b are made conductive to each other via the user's finger, the voltage at the base of the NPN-type transistor T1 is increased to a level corresponding to the conductive state. Therefore, an electric current flows from the collector to the emitter of the NPN-type transistor T1, and thus the infrared LED 203 emits light. Such a detection circuit may be provided for the input keys 205 representing the same input, so that the same infrared LED 203 emits infrared light whichever of the input keys 205 may be operated.

In the above-described example of the extended input device 200, one input key 205 includes two electrodes 206 and 207 to detect an input operation on the input key 205. The input operation on the input key 205 may be detected in another form. In a first example, one input key 205 includes one of the electrodes. The other electrode is provided on the top surface of the extended input device 200, in a region where no input key 205 is provided (e.g., an outer periphery of the top surface). With such an electrode structure, the user may make a key input while the hand of the user is in touch with the other electrode. The input key 205 operated by the user (one electrode) and the other electrode are made conductive to each other via the user's hand. Such a conductive state is detected to cause the infrared LED 203 to emit light in substantially the same manner as described above. In a second example, one input key 205 includes one of the electrodes. A terminal connected with a part of the body of the user in a wired manner is used as the other electrode. With such an electrode structure also, the user may make a key input while the part of his/her body is connected with the other electrode. The input key 205 operated by the user (one electrode) and the other electrode are made conductive to each other via the user's body. Such a conductive state is detected to cause the infrared LED 203 to emit light in substantially the same manner as described above.

Figure 14:
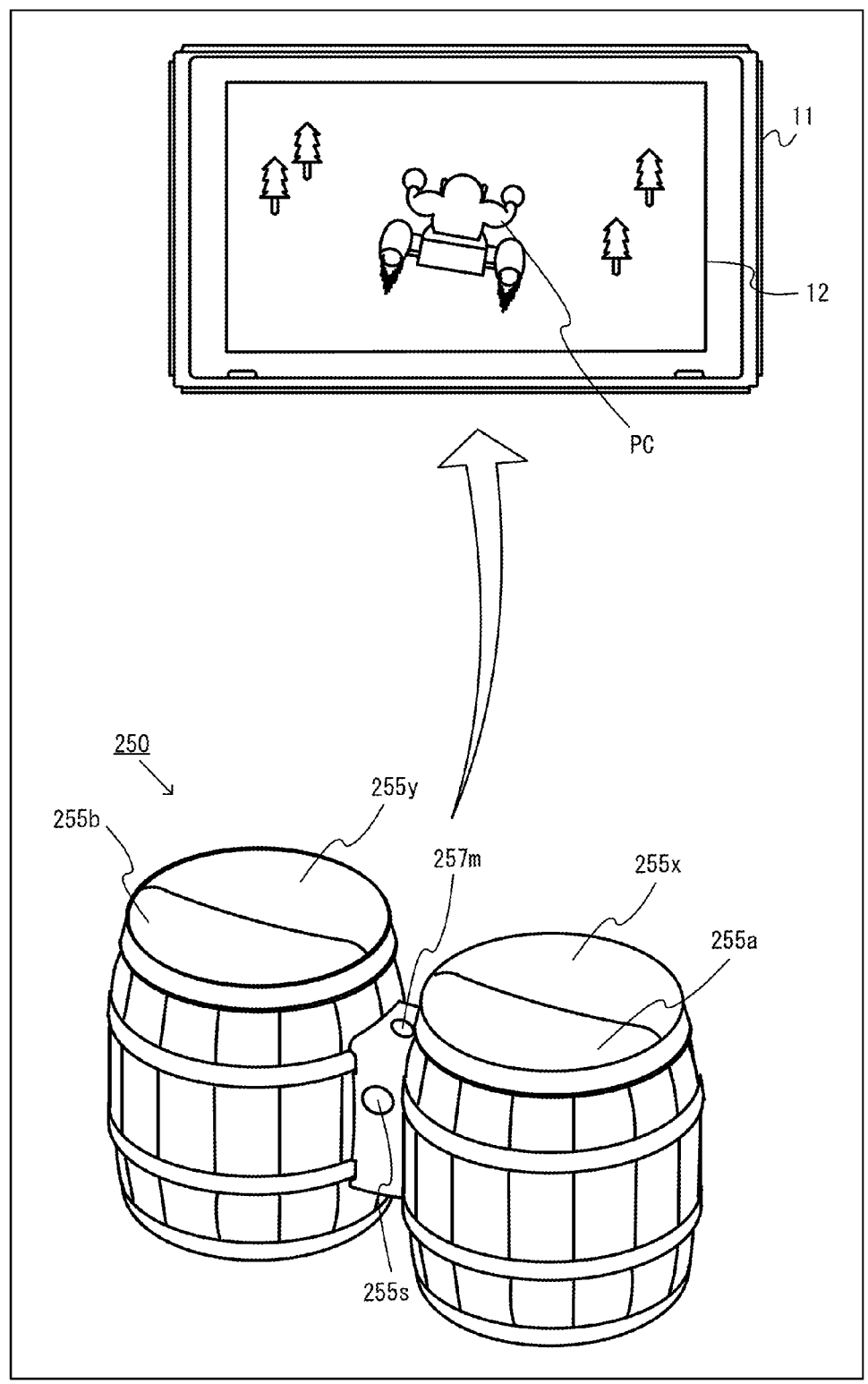
FIG. 14 shows a non-limiting example of game operation made by the user by use of an extended input device 250.

Now, with reference to FIG. 14, another example of using an extended input device will be described. In this example, a user operation is made by use of an extended input device 250. FIG. 14 shows an example of game operation made by the user by use of the extended input device 250. In this example also, the right controller 4 is attachable to the extended input device 250. Based on data transmitted from the right controller 4 attached to the extended input device 250, a process in accordance with the content of operation made on the extended input device 250 is executed. The content of operation made on the extended input device 250 is detected based on a captured image captured by the infrared image capturing section 123. Therefore, the extended input device 250 does not need to include an electric component such as an electronic circuit or the like that transmits the result of the detection of the input or the operation made by the user to the main body apparatus 2. For this reason, the structure of the extended input device 250 is simplified.

In this example, as shown in FIG. 14, the extended input device 250 is a drum-type controller including a plurality of operation surfaces 255a, 255b, 255x and 255y, an operation button 255s and a microphone 257m. The user beats at least one of the plurality of operation surfaces 255a, 255b, 255x and 255y, inputs a sound of a voice or the beat to the microphone 257m, or presses the operation button 255s. As a result, a player character PC makes a motion in accordance with the content of operation and displayed on the display device (e.g., the display 12 of the main body apparatus 2). In accordance with the operation made by use of the extended input device 250, a process of changing a virtual object located in the virtual space may be executed, the degree of matching of the operation timings may be determined, or various information may be displayed. Various game processes or information processes may be executed.

Figure 15:
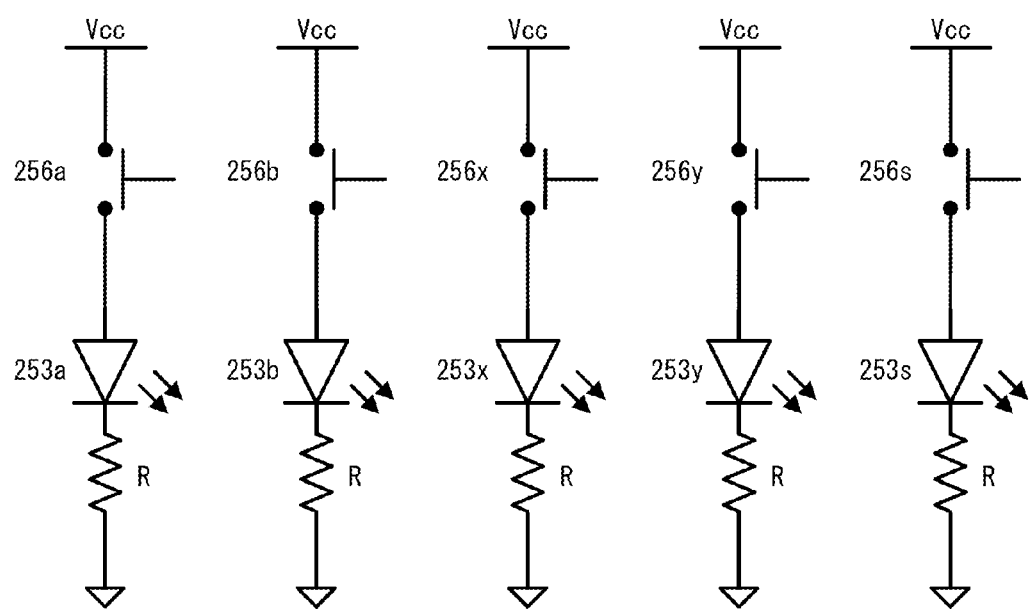
FIG. 15 shows a non-limiting example of circuit causing infrared LEDs 253 to emit light in accordance with an operation made on a plurality of operation surfaces 255a, 255b, 255x and 255y and an operation button 255s.
Figure 16:
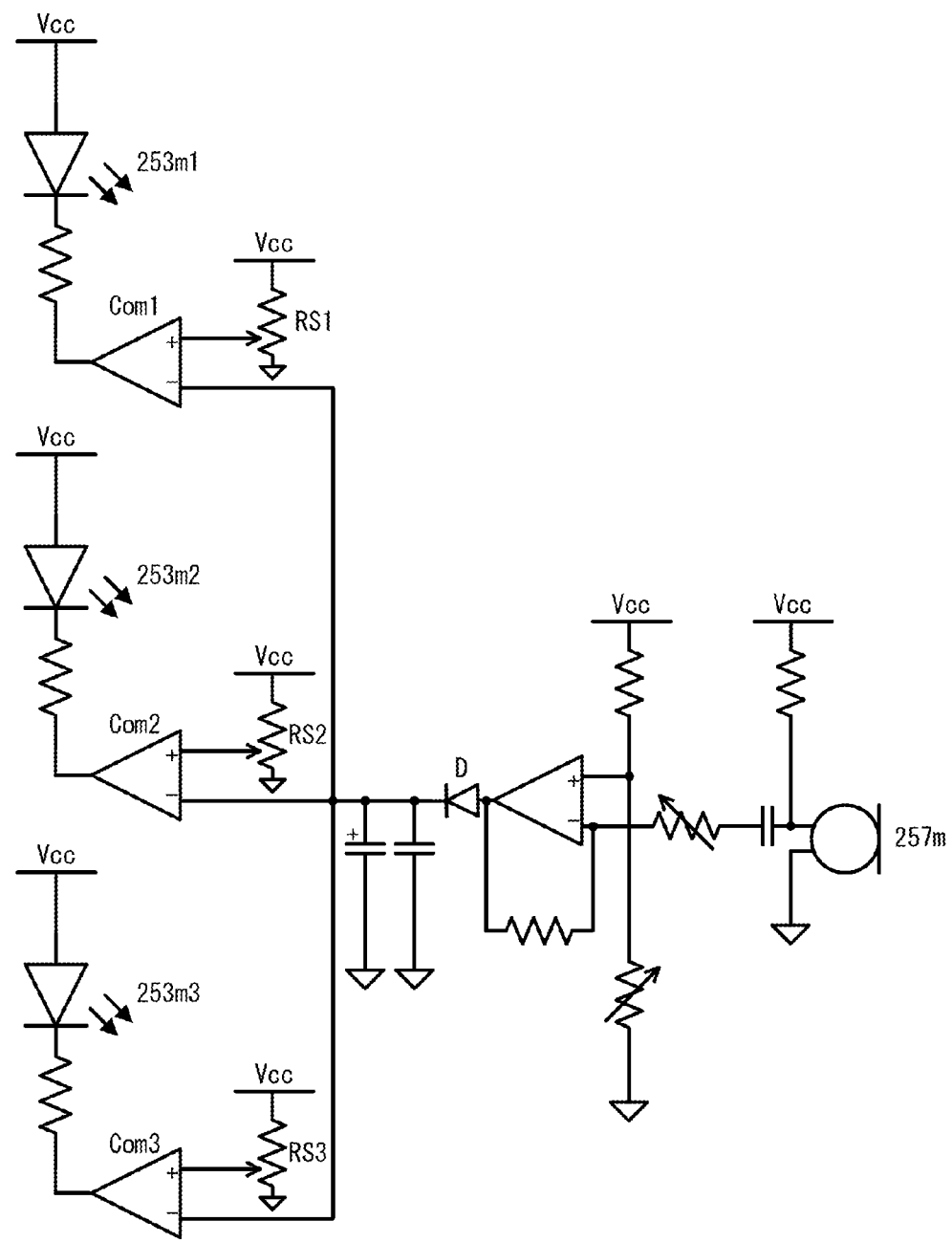
FIG. 16 shows a non-limiting example of circuit causing the infrared LEDs 253 to emit light in accordance with a sound input to a microphone 257m.

Now, with reference to FIG. 15 and FIG. 16, an internal structure of the extended input device 250 will be described. FIG. 15 shows an example of circuit causing an infrared LED 253 to emit light in accordance with the operation made on each of the plurality of operation surfaces 255a, 255b, 255x and 255y, and the operation button 255s. FIG. 16 shows an example of circuit causing the infrared LED 253 to emit light in accordance with the sound input made to the microphone 257m.

Like the extended input device 200 described above with reference to FIG. 9 and FIG. 10, the extended input device 250 accommodates, in an inner space thereof, a light emitting portion including the plurality of infrared LEDs 253 and a securing portion allowing the right controller 4 to be attached thereto. Namely, in the inner space of the extended input device 250 also, the right controller 4 is attached to the securing portion, so that the infrared image capturing section 123 is capable of capturing an image of the plurality of infrared LEDs 253. Also in the vicinity of the securing portion in the inner space of the extended input device 250, an NFC tag, which is a communication target of the NFC communication section 122, is provided, like in the extended input device 200. Upon attachment of the right controller 4 to the securing portion, the near field communication is made possible between the right controller 4 and the NFC tag.

As shown in FIG. 15, the plurality of operation surfaces 255a, 255b, 255x and 255y respectively include built-in switches 256a, 256b, 256x and 256y. The switches 256a, 256b, 256x and 256y are in an off state in a state where the operation surfaces 255a, 255b, 255x and 255y are not operated respectively, and are turned on when the operation surfaces 255a, 255b, 255x and 255y are beat respectively. The operation button 255s include a built-in switch 256s. The switch 256s is in an off state in a state where the operation button 255s is not operated, and is turned on when the operation button 255s is operated.

The extended input device 250 includes a detection circuit that, in accordance with the on/off state of the switches 256a, 256b, 256x, 256y and 256s causes the infrared LED 253 corresponding to the switch to emit infrared light. The detection circuit includes, for example, a circuit in which the power supply Vcc is grounded via the switch 256a, an infrared LED 253a and a resistance R. The detection circuit includes a circuit in which the power supply Vcc is grounded via the switch 256b, an infrared LED 253b and a resistance R. The detection circuit includes a circuit in which the power supply Vcc is grounded via the switch 256x, an infrared LED 253x and a resistance R. The detection circuit includes a circuit in which the power supply Vcc is grounded via the switch 256y, an infrared LED 253y and a resistance R. The detection circuit includes a circuit in which the power supply Vcc is grounded via the switch 256s, an infrared LED 253s and a resistance R. With such a detection circuit, in the case where the switch 256a, 256b, 256x, 256y or 256s is in an off state, the infrared LED 253a, 253b, 253x, 253y or 253s connected with the switch is not turned on. In the case where the switch 256a, 256b, 256x, 256y or 256s is in an on state, the infrared LED 253a, 253b, 253x, 253y or 253s connected with the switch is turned on. Such a circuit is provided for each of the operation portions, so that the infrared LED 253 corresponding to the operation surface or the operation button that has been operated is allowed to emit infrared light.

As shown in FIG. 16, the extended input device 250 includes a detection circuit causing different infrared LEDs 253 to emit infrared light in accordance with the volume of the sound input to the microphone 257m. For example, the detection circuit includes at least the microphone 257m, three infrared LEDs 253m1, 253m2 and 253m3 and three comparators Com1, Com2 and Com3 connected to each other. The infrared LED 253m1 is connected with a power supply Vcc and is also connected with an output terminal of the comparator Com1 via a predetermined resistance. A positive input terminal of the comparator Com1 is connected with the power supply Vcc via a variable resistance RS1. A voltage in accordance with the output of the microphone 257m is input to a negative input terminal of the comparator Com1. When the voltage in accordance with the output of the microphone 257m becomes higher than the voltage at the positive input terminal, the output from the output terminal of the comparator Com1 is changed from a high level voltage to a low level voltage. The infrared LED 253m2 is connected with the power supply Vcc and is also connected with an output terminal of the comparator Com2 via a predetermined resistance. A positive input terminal of the comparator Com2 is connected with the power supply Vcc via a variable resistance RS2. A voltage in accordance with the output of the microphone 257m is input to a negative input terminal of the comparator Com2, like to the negative input terminal of the comparator Com1. When the voltage in accordance with the output of the microphone 257m becomes higher than the voltage at the positive input terminal, the output from the output terminal of the comparator Com2 is changed from a high level voltage to a low level voltage. The infrared LED 253m3 is connected with the power supply Vcc and is also connected with an output terminal of the comparator Com3 via a predetermined resistance. A positive input terminal of the comparator Com3 is connected with the power supply Vcc via a variable resistance RS3. A voltage in accordance with the output of the microphone 257m is input to a negative input terminal of the comparator Com3, like to the negative input terminal of the comparator Com1 or Com2. When the voltage in accordance with the output of the microphone 257m becomes higher than the voltage at the positive input terminal, the output from the output terminal of the comparator Com3 is changed from a high level voltage to a low level voltage.

As described above, when the voltage in accordance with the output from the microphone 257m is changed, the levels of the outputs from the output terminals of the three comparators Com1, Com2 and Com3 are each changed based on the comparison with the voltage input to the respective positive input terminal. Therefore, the voltages input to the positive input terminals of the comparators Com1, Com2 and Com3 may be adjusted to be different from each other, so that the output voltage from the microphone 257m, which is changed in the level at the output terminals of the comparators Com1, Com2 and Com3, is adjusted. In the above-described detection circuit, the resistance values of the variable resistances RS1, RS2 and RS3 may be adjusted to adjust the voltage input to the positive input terminal of each of the comparators Com1, Com2 and Com3. The resistance values are adjusted to be different from each other.

In the case where the output from the output terminal of each of the comparators Com1, Com2 and Com3 is of a high level, the potential difference between the voltage at the output terminal and the voltage at the positive input terminal of the corresponding comparator is very small and thus the corresponding LED among the infrared LEDs 253m1, 253m2 and 253m3 is not turned on. By contrast, in the case where the output from the output terminal of each of the comparators Com1, Com2 and Com3 is of a low level, the potential difference between the voltage at the output terminal and the voltage at the positive input terminal is large and thus the corresponding LED among the infrared LEDs 253m1, 253m2 and 253m3 is turned on. Namely, the resistance values of the variable resistances RS1, RS2 and RS3 are adjusted to be different from each other, so that the infrared LEDs 253m1, 253m2 and 253m3 are turned on at different output voltages from the microphone 257m. Therefore, in the above-described detection circuit, the different infrared LEDs 253 are turned on step by step in accordance with the output voltage from the microphone 257m, namely, the volume of the sound input to the microphone 257m.

As described above, the extended input device 250 controls the infrared LEDs 253a, 253b, 253x, 253y and 253s to be turned on or turned off in accordance with the operation made on the plurality of operation surfaces 255a, 255b, 255x and 255y and the operation button 255s. The extended input device 250 controls the infrared LEDs 253m1, 253m2 and 253m3 to be turned on or turned off step by step in accordance with the volume of the sound input to the microphone 257m (i.e., the amount of input to, or the amount of operation on, the microphone 257m). The infrared image capturing section 123 captures an image of infrared light emitted by the infrared LEDs 253a, 253b, 253x, 253y, 253s, 253m1, 253m2 and 253m3, so that the content of operation on, or the content of input to, the extended input device 250 is distinguished based on the captured image.

In the extended input device 200 described above, each of the input keys 250 may include a switch, like in the extended input device 250. A switch that is turned on when being pressed may be provided for each input key 205, so that a detection circuit for the extended input device 200 may be provided with substantially the same circuit configuration as that in the extended input device 250.

In the above-described examples, the keyboard-type extended input device and the drum-type extended input device are used. Needless to say, an operation device, an input device, a controller or the like of any other type is usable. For example, a musical instrument-type controller in the form of a string instrument such as a guitar or the like, an aerophone such as an ocarina, a recorder or the like, a keyboard instrument such as a piano or the like may be used as an extended input device. In an example, in the case where a musical instrument-type controller in the form of a guitar may operate as follows as an extended input device. The fret touched by the user is detected, like the input key 205 described above, and the vibration caused by the picking on a string made by the user is detected by a microphone. Thus, the microphone detects the amplitude of the vibration input thereto, like the microphone 257m. In another example, a musical instrument-type controller in the form of an ocarina may operate as follows as an extended input device. The hole touched by the user is detected, like the input key 205 described above, and the breath blown by the user is detected by the microphone. Thus, the microphone detects the amount of air input thereto, like the microphone 257m.

Alternatively, a mat-type controller or a board-type controller operable by the user riding thereon may be used as an extended input device. In the case where, for example, a load value that is input to the board-type controller is detected by a load sensor, digital information indicating the load value may be represented by whether the infrared LED is turned on or turned off, and the infrared image capturing section 123 may capture an image of the infrared LED in the state of being on or in the state of being off. In the case where, for example, the digital information indicating the load value is represented by 16 bits, 16 infrared LEDs may be prepared, so that the value of each of the bits is represented by whether the infrared LED corresponding to the bit is turned on or turned off. Thus, the digital information is represented.

Figure 17:
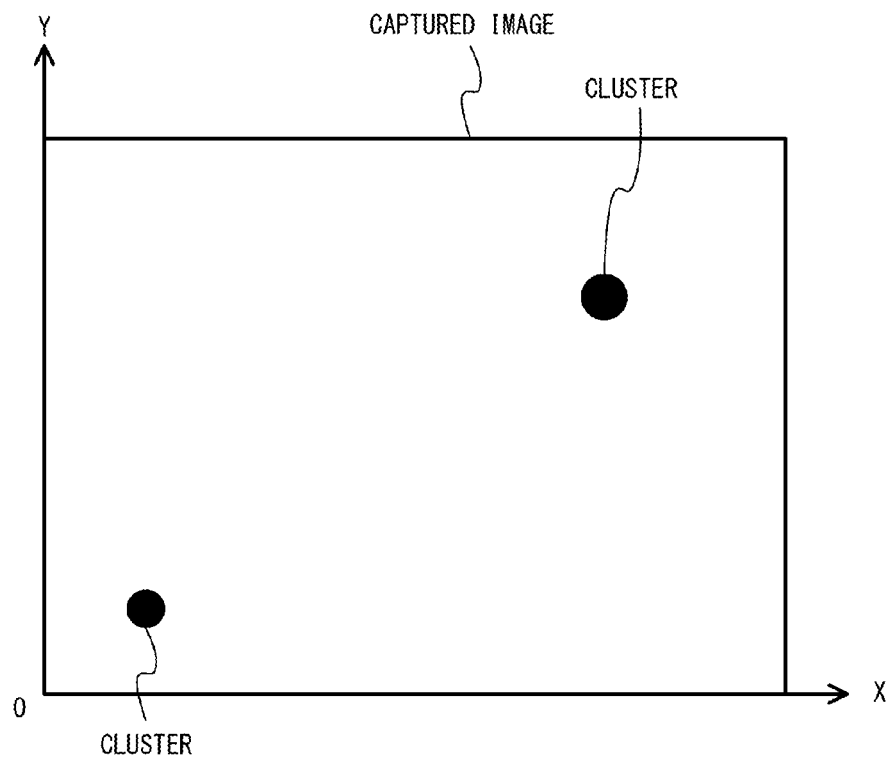
FIG. 17 shows a non-limiting example of information on an image capturing target that is calculated in a first mode (cluster mode)
Figure 18:
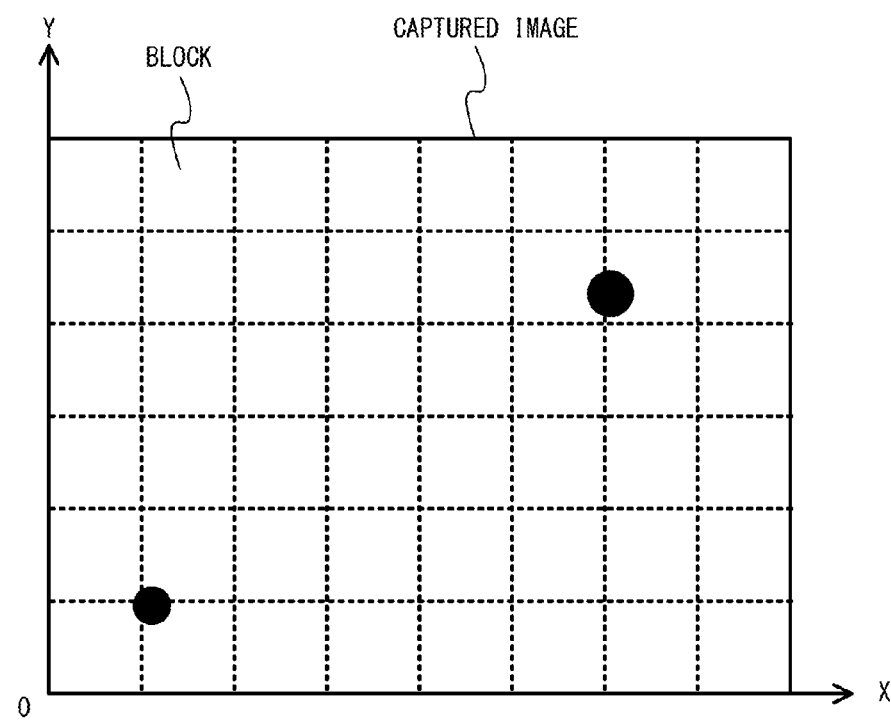
FIG. 18 shows a non-limiting example of information on the image capturing target that is calculated in a second mode (moment mode)

Now, with reference to FIG. 17 and FIG. 18, information on an image capturing target calculated from a captured image captured by the infrared image capturing section 123 will be described. FIG. 17 shows an example of information on an image capturing target calculated in a first mode (clustering mode). FIG. 18 shows an example of information on an image capturing target calculated in a second mode (moment mode).

Referring to FIG. 17, the above-mentioned information is calculated in the first mode as follows. From the captured image captured by the infrared image capturing section 123, a cluster of high-luminance pixels is detected, and the position or the size of the cluster in the captured image is calculated. For example, as shown in FIG. 17, for the entirety of the captured image captured by the infrared image capturing section 123 or for a partial region of the captured image from which the information is to be calculated (for an analysis window described below), predetermined coordinate axes (e.g., X axis for the horizontal direction and Y axis for the vertical direction) are set. From the image for which the coordinate axes are set, a pixel group of pixels that are adjacent to each other is extracted, the pixels having a predetermined threshold level or higher. In the case where the pixel group has a size in a predetermined range (a first predetermined level or larger and a second predetermined level or smaller), the pixel group is determined as being a cluster. In a captured image of the infrared LED 203 emitting light in the extended input device 200 or of an infrared LED 253 emitting light in the extended input device 250, pixels corresponding to the infrared LED 203 or the infrared LED 253 emitting infrared light are extracted as high luminance pixels and determined as being a cluster. In the first mode, a total number of the clusters thus extracted is calculated, and also the average luminance, the area size (the number of the pixels), the center-of-gravity coordinate, and the circumscribed rectangle of each cluster are calculated. The results of the calculations are provided as information on the image capturing target.

The information on the image capturing target calculated in the first mode is transmitted from the right controller 4 to the main body apparatus 2. Based on the information on the image capturing target received by the main body apparatus 2, which of the infrared LEDs is turned on is distinguished. For example, the main body apparatus 2 may use the center-of-gravity coordinate of each of the clusters to calculate the position of the infrared LED that is turned on. Based on the position of the infrared LED that is turned on, the user input or the user operation made on the extended input device is specified.

For calculating the position (the center-of-gravity coordinate or the position of the circumscribed rectangle) of each cluster in the first mode, the calculation may be made on the basis of a reference position set in the captured image. The position of each cluster may be calculated on the basis of the reference position, so that the position, the orientation, the shape and the like of each cluster are detected with high precision.

In an example, the reference position may be set at a position of a reference infrared LED that is emitting light (e.g., the center-of-gravity coordinate of a high luminance pixel corresponding to an image of the reference infrared LED). Specifically, the reference position may be set as follows. In a state where the right controller 4 is attached to the extended input device 200 or the extended input device 250, the user is urged to perform a predetermined initial setting operation, so that either one of the infrared LEDs 203 or either one of the infrared LEDs 253 (i.e., the reference infrared LED) is turned on. In the initial setting operation, the position at which an image of the reference infrared LED is captured may be set as the reference position. In this case, based on the reference position, the coordinate axis may be set for the entirety of the captured image or for the analysis window as a partial region of the captured image. In addition, a difference value between the position at which the image of the reference infrared LED is captured and the position at which the image of the reference infrared LED should be captured may be calculated, and the difference value may be set as a correction value usable for future position calculation. The initial setting operation may be performed during the production of the extended input device 200 or the extended input device 250. In this case, the information on the reference position that is set during the production may be stored on the NFC tag provided in the extended input device 200 or the extended input device 250. Even in the case where the user performs the initial setting operation, information on the reference position set by the initial setting operation made by the user may be stored on the NFC tag provided in the extended input device 200 or the extended input device 250.

In another example, the reference position may be set at a position at which the image of a predetermined image capturing target, different from the infrared LED that is turned on in accordance with the user input and/or the user operation, is captured. Specifically, the reference position may be set as follows. A reference marker formed of an infrared LED different from the infrared LED 203 or the infrared LED 253 described above or a retroreflective material and having a predetermined shape is provided at a position having a predetermined positional relationship with the infrared LED 203 or the infrared LED 253. The position of the reference marker is set as the reference position. For analyzing the captured image captured by the infrared image capturing section 123, the position of the infrared LED that is emitting light as the reference marker, or the position of the reference marker obtained by image processing performed on the captured image by use of pattern matching, is calculated.

Referring to FIG. 18, in the second mode, the captured image captured by the infrared image capturing section 123 is divided into a plurality of blocks, and the average luminance and the position of the center of gravity of each of the blocks are calculated. For example, as shown in FIG. 18, for the entirety of the captured image captured by the infrared image capturing section 123 or for a partial region of the captured image from which the information is to be calculated (for the analysis window described below), predetermined coordinate axes (e.g., X axis for the horizontal direction and Y axis for the vertical direction) are set. The image for which the coordinate axes are set is divided into predetermined blocks (e.g., 8×6=48 blocks). For each block, pixels having a predetermined threshold level or higher are used as processing targets to calculate a total luminance of each block, a primary moment in the horizontal direction luminance of each block, and a primary moment in the vertical direction luminance of each block. The results of the calculations are provided as information on the image capturing target. For example, the total luminance of each block is a sum of luminance of all the pixels included in each block, and is a parameter. More specifically, the total luminance of the block is divided by the number of the pixels in the block to find the average luminance of the block. The primary moment in the horizontal direction luminance of each block is found as follows. The luminance of each pixel included in the block is multiplied by the position of the pixel in the X-axis direction of the block, and such resultant values of all the pixels included in the block are added together. The primary moment in the horizontal direction luminance of each block is a parameter. More specifically, the primary moment in the horizontal direction luminance of the block is divided by the total luminance of the block to find the position of the center of gravity of the luminance in the horizontal direction of the block. The primary moment in the vertical direction luminance of each block is found as follows. The luminance of each pixel included in the block is multiplied by the position of the pixel in the Y-axis direction of the block, and such resultant values of all the pixels included in the block are added together. The primary moment in the vertical direction luminance of each block is a parameter. More specifically, the primary moment in the vertical direction luminance of the block is divided by the total luminance of the block to find the position of the center of gravity of the luminance in the vertical direction luminance of the block.

The information on the image capturing target in the first mode or the information on the image capturing target in the second mode are calculated by the right controller 4 and transmitted to the main body apparatus 2. As compared with the case where data representing the captured image itself captured by the infrared image capturing section 123 is transmitted, the amount of data to be transmitted to the main body apparatus 2 is decreased, and the processing load on the main body apparatus 2 is decreased. Since the amount of data on information on the image capturing target is small, the information on the image capturing target may be transmitted as being incorporated into another operation data transmitted from the right controller 4 to the main body apparatus 2. Thus, the communication processing between the right controller 4 and the main body apparatus 2 is simplified. In the exemplary embodiment, information calculated in the first mode or the second mode by use of the captured image of an image capturing target, which is the plurality of infrared LEDs in the state of being turned on or off, may be transmitted to the main body apparatus 2. Based on the information on such an image capturing target, the user input or the user operation made on the extended input device is distinguished. Namely, even in the case where the number of the infrared LEDs or the positional arrangement thereof is different in accordance with the type of the extended input device, the information on the image capturing target may be calculated in the first mode or in the second mode from substantially the same captured image and transmitted to the main body apparatus 2. Therefore, it is not necessary to prepare a different data format for each type of the extended input device, and various types of extended input devices may be added by use of the same data format (i.e., data on the image capturing target in the first mode or the second mode).

Figure 19:
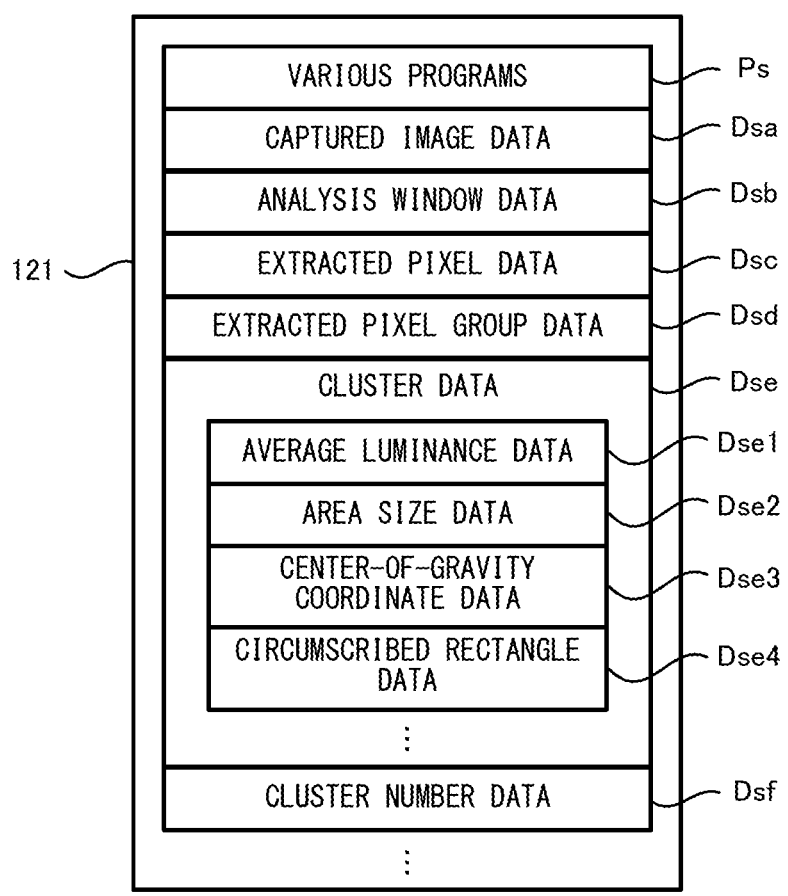
FIG. 19 shows a non-limiting example of data region set in a memory in the right controller 4.

Now, with reference to FIG. 19 and FIG. 20, an example of specific process executed by the right controller 4 in the exemplary embodiment will be described. FIG. 19 shows an example of data region set on a memory in the right controller 4 (e.g., memory included in the processing section 121) in the exemplary embodiment. The memory in the right controller 4 has the data shown in FIG. 19 and also data usable for another process, which will not be described in detail. Regarding an information calculation process (described below) executed by the right controller 4, an example of calculating information on an image capturing target in the first mode (clustering mode) will be described.

In a program storage region of the memory in the right controller 4, various programs Ps executable by the processing section 121 are stored. In the exemplary embodiment, the various programs Ps include an information calculation program for acquiring and calculating information based on the result of the image capturing of the above-described captured image, a program for transmitting the calculated information to the main body apparatus 2, and the like. The various programs Ps may be stored on the right controller 4 in advance, may be acquired from a storage medium attached to, and detachable from, the main body apparatus 2 (e.g., a first type of storage medium attached to the first slot 23, or a second type of storage medium attached to the second slot 24) and stored on the memory in the right controller 4, or may be acquired from another device via a network such as the Internet or the like and stored on the memory in the right controller 4. The processing section 121 executes the various programs Ps stored on the memory in the right controller 4.

In the data storage area of the memory in the right controller 4, various types of data usable for processes executable by the processing section 121 are stored. In the exemplary embodiment, the data storage area of the memory in the right controller 4 has, stored thereon, captured image data Dsa, analysis window data Dsb, extracted pixel data Dsc, extracted pixel group data Dsd, cluster data Dse, cluster number data Dsf and the like.

The captured image data Dsa represents a captured image captured by the infrared image capturing section 123. In the exemplary embodiment, the infrared image capturing section 123 executes an image capturing process at a cycle based on an instruction from the processing section 121. Such a captured image is used to update the captured image data Dsa when necessary. The captured image data Dsa may be updated at a cycle of process executed by the processing section 121 (described below) and/or at a cycle of process executed by the CPU 81, or may be updated at a cycle of the above-described image capturing.

The analysis window data Dsb represents an image in a range (analysis windows) to be analyzed to calculate information based on the image capturing result, the range being a part of the captured image stored in the captured image data Dsa.

The extracted pixel data Dsc represents pixels having a luminance of a threshold level or higher that are extracted from the image in the analysis window. The extracted pixel group data Dsd represents a pixel group of the extracted pixels adjacent to each other, the extracted pixels being extracted from the image in the analysis window.

The cluster data Dse represents information on each pixel group determined as being a cluster based on the image in the analysis window. The cluster data Dse includes average luminance data Dse1, area size data Dse2, center-of-gravity coordinate data Dse3, circumscribed rectangle data Dse4 and the like. The average luminance data Dse1 represents an average luminance of each cluster. The area size data Dse2 represents an area size (number of pixels) of each cluster. The center-of-gravity coordinate data Dse3 represents a center-of-gravity coordinate of each cluster. The circumscribed rectangle data Dse4 represents the position and the size of a circumscribed rectangle of each cluster in a predetermined direction.

The cluster number data Dsf represents the number of clusters extracted from the image in the analysis window.

Now, an example of process of calculating information based on the image capturing result (hereinafter, the process will be referred to simply as the "information calculation process") in the exemplary embodiment will be described in detail. FIG. 20 is a flowchart showing an example of information calculation process executable by the CPU in the processing section 121. In the exemplary embodiment, a series of processes shown in FIG. 20 are performed by the CPU in the processing section 121 executing the information calculation program or the like included in the various program Ps. The timing to start the information calculation process shown in FIG. 20 is optional.

Figure 20:
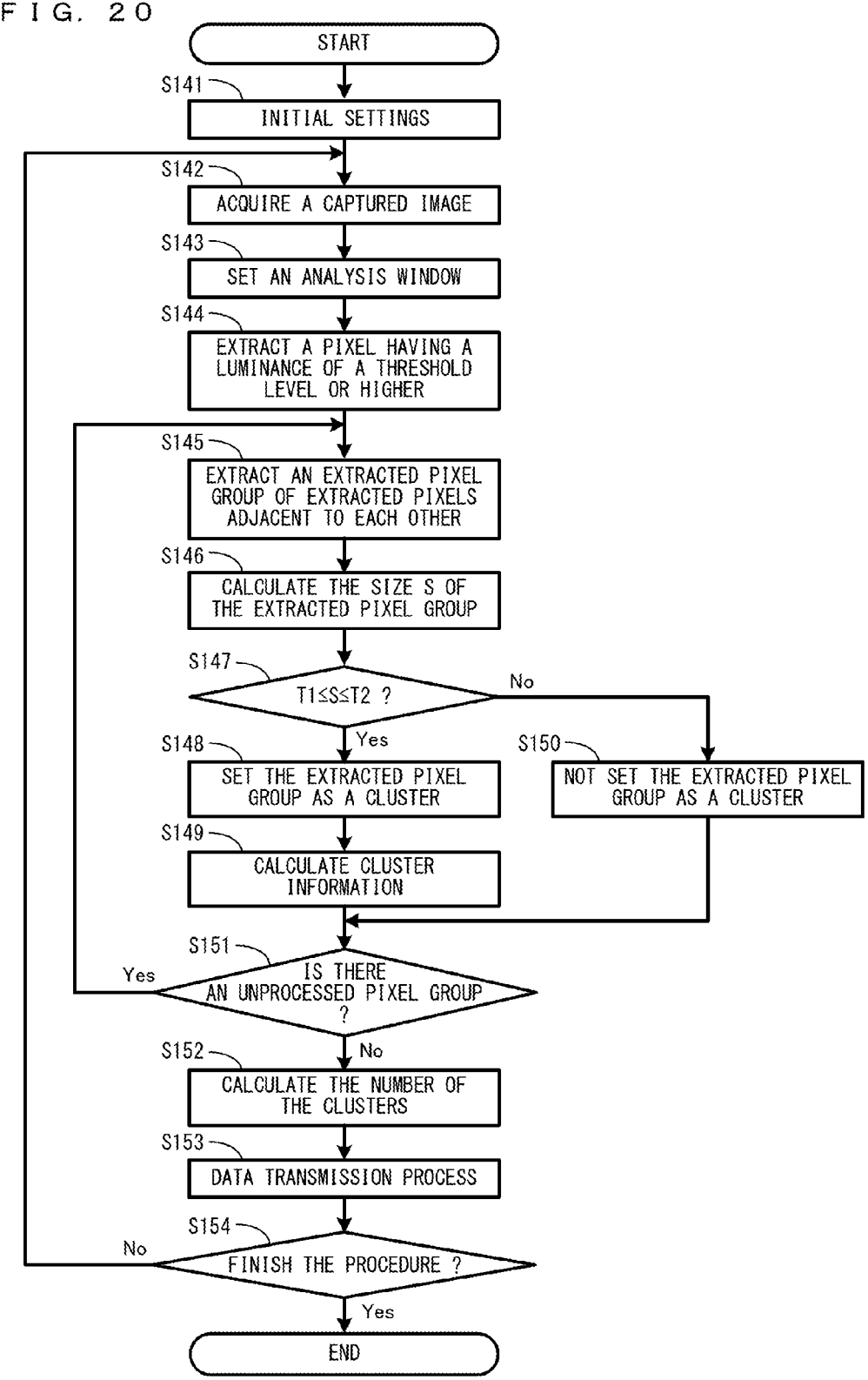
FIG. 20 is a flowchart showing a non-limiting example of information calculation process executable by a CPU of a processing section 121.

The process in each of the steps shown in FIG. 20 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU in the processing section 121. A part of the processes in the steps may be executed by a processor other than the CPU in the processing section 121 or by a dedicated circuit. A part of the processes executable by the right controller 4 may be executed by another information processing apparatus communicable with the right controller 4 (e.g., main body apparatus 2, or server communicable with the main body apparatus 2). Namely, the processes shown in FIG. 20 may be executed by a cooperation of a plurality of information processing apparatuses including the right controller 4.

As shown in FIG. 20, the CPU in the processing section 121 performs initial settings in the information calculation process (step S141), and advances the process to the next step. For example, in the initial settings, the CPU in the processing section 121 initializes parameters usable to perform the processes described below. In the initial settings, the CPU in the processing section 121 sets, when necessary, the type of, or identification information on, the extended input device to which the right controller 4 is attached. For example, the user may make an operation of selecting the type of the expanded input device, or may make an initial setting operation of setting a reference position, by use of the main body apparatus 2, the left controller 3 or the right controller 4, so that the initial setting of the type of the extended input device may be made and calibration may be performed. In another example, in the case where the right controller 4 is capable of performing near field communication with a communication target provided in the extended input device via the NFC communication section 122, the type, the identification information, and the calibration information of the extended input device may be acquired from the communication target, so that the initial settings on the type, the identification information, and the calibration information of the expanded input device are made.

In the initial settings, the CPU in the processing section 121 initially sets a part of the captured image as a range (analysis window) to be analyzed to calculate information based on the image capturing result. The CPU sets a coordinate axis in the analysis window. The range of the analysis window may be set based on an instruction from the main body apparatus 2 or may be predefined in accordance with the type of the expanded input device. A plurality of analysis windows may be set. In this case, information based on the image capturing results on different analysis windows are calculated in a time-series manner. Instead of calculating information based on the image capturing result on the entirety of the captured image, the CPU sets a region of the captured image as the analysis window and calculates information based on the image capturing result on the analysis window. Thus, the analysis is made on information on a limited region of the captured image. A region of the captured image that is not required to calculate the information based on the image capturing result is excluded from the target of the calculation. Therefore, for example, a region showing reflected light that is not necessary for the calculation is eliminated. As a result, the precision of the information based on the image capturing result is improved.

Next, the CPU in the processing section 121 acquires the captured image captured by the infrared image capturing section 123 (step S142), and advances the process to the next step. For example, the CPU in the processing section 121 acquires a captured image from the infrared image capturing section 123, and updates the captured image data Dsa.

Next, the CPU in the processing section 121 sets an analysis window (step S143), and advances the process to the next step. For example, the CPU in the processing section 121 cuts an image in the analysis window out of the captured image stored in the captured image data Dsa, based on the range of the analysis window initially set, sets a coordinate axis in the analysis window, and uses the cut-out image to update the analysis window data Dsb.

Next, the CPU in the processing section 121 extracts pixels having a luminance of a predetermined threshold level or higher from the image in the analysis window (step S144), and advances the process to the next step. For example, the CPU in the processing section 121 extracts, as extracted pixels, pixels having a luminance of a predetermined threshold level or higher from the image stored in the analysis window data Dsb, and uses the extracted pixels to update the extracted pixel data Dsc.

Next, the CPU in the processing section 121 extracts, from the image in the analysis window, a pixel group of the extracted pixels adjacent to each other, the pixels being extracted in step S144 (step S145), and advances the process to the next step. For example, the CPU in the processing section 121 selects, from the extracted pixel groups extracted from the image in the analysis window, one of the extracted groups on which the processes in steps S146 through S150 described below have not been performed. The one of the extracted pixel groups is selected as a processing target of the processes to be executed later. The CPU in the processing section 121 uses data representing the selected extracted pixel group to update the extracted pixel group data Dsd.

Next, the CPU in the processing section 121 calculates a size S of the extracted pixel group that is the current processing target (step S146), and advances the process to the next step. For example, the CPU in the processing section 121 calculates the size S of the extracted pixel group (e.g., the number S of pixels) represented by the extracted pixel group data Dsd.

Next, the CPU in the processing section 121 determines whether or not the size S calculated in step S146 is in the range of the first threshold level T1 or larger and the second threshold level T2 or smaller (T2>T1) (step S147). The first threshold level T1 is a value representing the minimum size by which the image capturing target (e.g., infrared LED emitting light) is recognized as a cluster of high-luminance pixels captured and included in the image in the analysis window. The second threshold level T2 is a value representing the maximum size by which the image capturing target is recognized as a cluster captured and included in the image in the analysis window. In the case where the size S is in the range of the first threshold level T1 or larger and the second threshold level T2 or smaller, the CPU in the processing section 121 advances the process to step S148. By contrast, in the case where the size S is not in the range of the first threshold level T1 or larger and the second threshold level T2 or smaller, the CPU in the processing section 121 advances the process to step S150.

In step S148, the CPU in the processing section 121 sets the extracted pixel group that is the current processing target as a cluster. The CPU in the processing section 121 calculates cluster information on the cluster that is set in step S148 (step S149), and advances the process to step S151. For example, in step S149, the CPU in the processing section 121 calculates the average luminance of the extracted pixel group represented by the extracted pixel group data Dsd, and uses the calculated average luminance to update the average luminance data Dse1 in the cluster data Dse corresponding to the cluster that is set in step S148. The CPU in the processing section 121 uses the size S calculated in step S146 to update the area size data Dse2 in the cluster data Dse corresponding to the cluster that is set in step S148. The CPU in the processing section 121 calculates the position of the center of gravity of the extracted pixel group represented by the extracted pixel group data Dsd, and uses the coordinate position representing the position center of gravity in the image in the analysis window (e.g., XY coordinate value shown in FIG. 17) to update the center-of-gravity coordinate data Dse3 in the cluster data Dse corresponding to the cluster that is set in step S148. The CPU in the processing section 121 sets a circumscribed rectangle of the extracted pixel group represented by the extracted pixel group data Dsd and having a side extending in a predetermined direction in the image in the analysis window (e.g., side parallel to the X axis or the Y axis shown in FIG. 17), and uses coordinate values representing the positions of two apexes facing each other in the rectangle (e.g., the XY coordinate values shown in FIG. 17) to update the circumscribed rectangle data Dse4 in the cluster data Dse corresponding to the cluster that is set in step S148.

In step S150, the CPU in the processing section 121 does not set the extracted pixel group that is the current processing target as a cluster and advances the process to step S151.

In step S151, the CPU in the processing section 121 determines whether or not there is still an extracted pixel group on which the processes in steps S145 through S150 have not been performed in the image in the analysis window. In the case where there is still such an extracted pixel group, the CPU in the processing section 121 returns the process to step S145 and repeats the processes. By contrast, in the case where there is no such extracted pixel group, the CPU in the processing section 121 deletes the cluster data Dse in which the cluster information was not updated in step S149 and advances the process to step S152.

In step S152, the CPU in the processing section 121 calculates the number of the clusters set from the image in the analysis window in step S148, and advances the process to the next step. For example, the CPU in the processing section 121 uses the number of the clusters set from the image in the analysis window to update the cluster number data Dsf.

Next, the CPU in the processing section 121 executes a process of transmitting data representing information based on the image capturing result to the main body apparatus 2 (step S153), and advances the process to the next step. For example, the CPU in the processing section 121 uses the cluster data Dse and the cluster number data Dsf to generate data to be transmitted to the main body apparatus 2, and outputs the data to the communication control section 111. As a result, the communication control section 111 generates, as operation data, information based on the image capturing result as well as other operation data (button operation data, acceleration data, angular velocity data, etc.), and transmits the operation data to the main body apparatus 2 at a predetermined transmission cycle. For transmitting the above data to the main body apparatus 2, the CPU in the processing section 121 may incorporate, into the data, the type, the identification information, the calibration information and the like of the extended input device acquired from the communication target provided in the extended input device.

Next, the CPU in the processing section 121 determines whether or not to finish the information calculation process (step S154). A condition under which the information calculation process is to be finished in step S154 is, for example, that an instruction to finish the information calculation process is received from the main body apparatus 2, that the user made an operation of finishing the information calculation process, or the like. When determining not to finish the information calculation process, the CPU in the processing section 121 returns the process to step S142 to repeat the above-described processes. When determining to finish the information calculation process, the CPU in the processing section 121 finishes the information calculation process shown in the flowchart. The series of processes in steps S142 through S154 are repeated until it is determined to finish the information calculation process in step S154.

Figure 21:
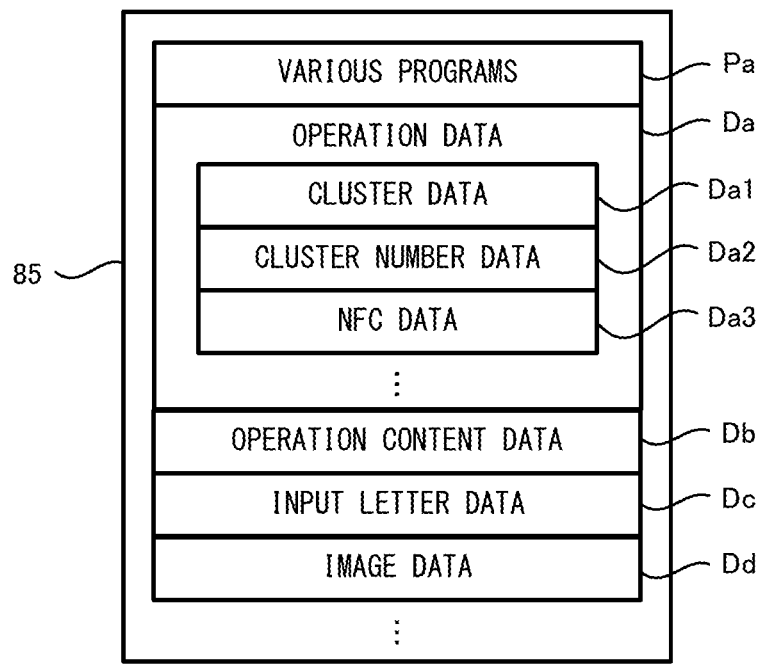
FIG. 21 shows a non-limiting example of data region set for a DRAM 85 in the main body apparatus 2.

Now, with reference to FIG. 21 and FIG. 22, an example of specific process executable by the main body apparatus 2 in the exemplary embodiment will be described. FIG. 21 shows an example of data storage area set in the DRAM 85 of the main body apparatus 2 in the exemplary embodiment. The DRAM 85 stores to the data shown in FIG. 21 and also data usable in other processes, which will not be described herein in detail. In the information process executed by the main body apparatus 2 described below, information on the image capturing target calculated in the first mode (clustering mode) is used, for example.

In a program storage area of the DRAM 85, various programs Pa executable by the main body apparatus 2 is stored. In the exemplary embodiment, the various programs Pa include a communication program usable for wireless communication with the left controller 3 and/or the right controller 4 described above, an application program usable to perform an information process (e.g., a letter input process or a game process) based on data acquired from the left controller 3 and/or the right controller 4, and the like. The various programs Pa may be stored on the flash memory 84 in advance, may be acquired from a storage medium attachable to, or detachable from, the main body apparatus 2 (e.g., the first type storage medium attached to the first slot 23 or the second type storage medium attached to the second slot 24) and stored on the DRAM 85, or may be acquired from another apparatus via a network such as the Internet or the like and stored on the DRAM 85. The CPU 81 executes the various programs Pa stored on the DRAM 85.

In a data storage area of the DRAM 85, various types of data usable for a communication process, an information process or the like executable by the main body apparatus 2 are stored. In the exemplary embodiment, the DRAM 85 has, stored thereon, operation data Da, operation content data Db, input letter data Dc, image data Dd, and the like.

The operation data Da is operation data acquired from the right controller 4 when necessary. As described above, the operation data transmitted from the right controller 4 includes information regarding inputs from the input sections (specifically, the buttons, the analog sticks, and the sensors) (the information regarding the inputs specifically include information on the operations, and detection results provided by the sensors) and information based on the result of the image capturing performed by the infrared image capturing section 123. In the case where the right controller 4 has already acquired the type, the identification information, the calibration information and the like of the extended input device from the communication target provided in the extended input device, such information may be included in the operation data transmitted from the right controller 4. In the exemplary embodiment, the operation data is transmitted from the right controller 4 at a predetermined cycle via wireless communication, and the received operation data is used to update the operation data Da when necessary. The operation data Da may be updated every frame, which is a cycle of the process executed by the main body apparatus 2 as described below, or may be updated at a cycle by which the operation data is transmitted via the above-described wireless communication. The operation data Da includes cluster data Da1, cluster number data Da2, and NFC data Da3. The cluster data Da1 represents information on each cluster calculated by the processing section 121 in the right controller 4. The cluster number data Da2 represents the number of the clusters extracted by the processing section 121 in the right controller 4. The NFC data Da3 represents the type, the identification information, the calibration information and the like of the extended input device acquired by the right controller 4 from the communication target provided in the extended input device.

The operation content data Db represents the content of operation made by use of the extended input device (e.g., extended input device 200) and is calculated based on the cluster data Da1 and the cluster number data Da2.

The input letter data Dc represents an input letter in accordance with the user input that is set based on the content of operation.

The image data Dd is data usable to display an image (e.g., an image showing the letter input by the user, an image of the background, etc.) on the display device (e.g., display 12 of the main body apparatus 2) for the information process.

Now, an example of information process (e.g., a letter input process) in the exemplary embodiment will be described in detail. FIG. 22 is a flowchart showing an example of information process executable by the main body apparatus 2. In the exemplary embodiment, the series of processes shown in FIG. 22 are executed by the CPU 81 executing a communication program or a predetermined application program (e.g., a letter input program) included in the various programs Pa. The timing to start the information process shown in FIG. 22 is optional.

Figure 22:
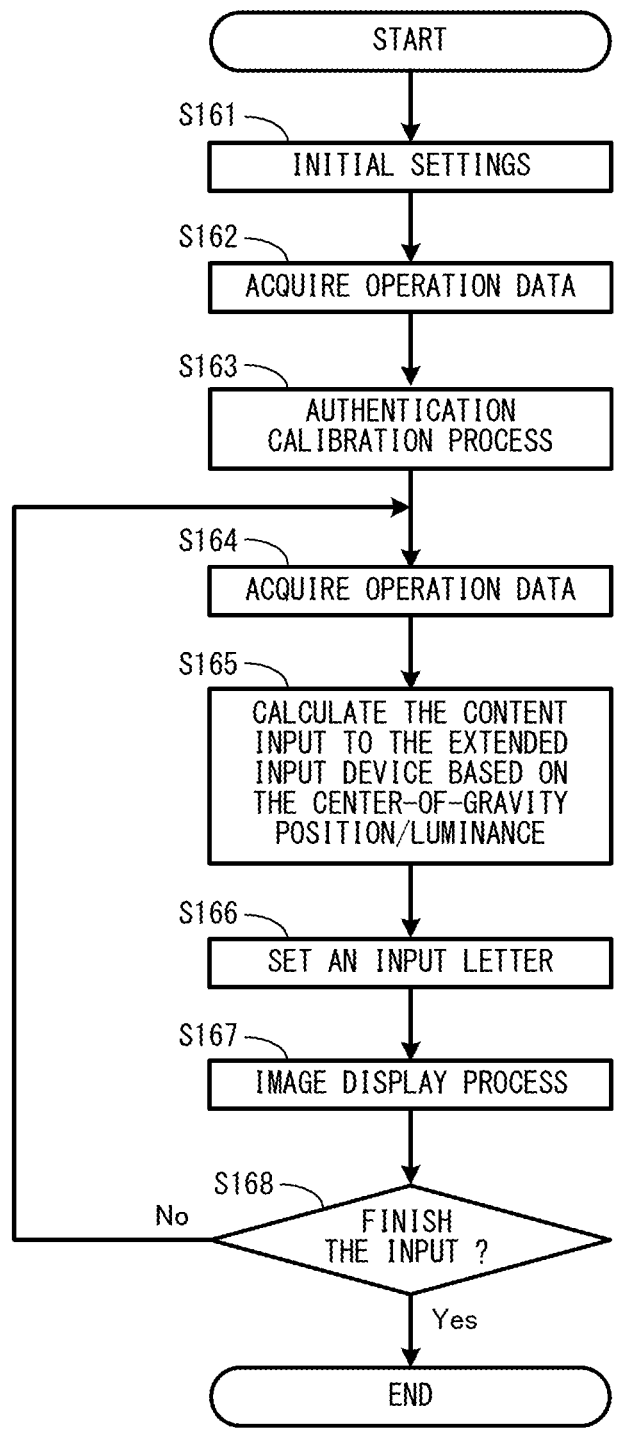
FIG. 22 is a flowchart showing a non-limiting example of information process executable by the main body apparatus 2.

The process in each of the steps shown in FIG. 22 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU 81. A part of the processes in the steps may be executed by a processor other than the CPU 81 or a dedicated circuit. A part of the processes executable by the main body apparatus 2 may be executed by another information processing apparatus communicable with the main body apparatus 2 (e.g., server communicable with the main body apparatus 2 via a network). Namely, the processes shown in FIG. 22 may be executed by cooperation of a plurality of information processing apparatuses including the main body apparatus 2.

Referring to FIG. 22, the CPU 81 performs initial settings for the information process (step S161) and advances the process to the next step. For example, in the initial settings, the CPU 81 initializes parameters usable to perform the processes described below.

Next, the CPU 81 acquires operation data from the right controller 4 to update the operation data Da (step S162), and advances the process to the next step. For example, the CPU 81 updates the cluster data Da1, the cluster number data Da2, and the NFC data Da3 in accordance with the operation data acquired from the right controller 4.

Next, the CPU 81 performs an authentication calibration process (step S163), and advances the process to the next step. For example, in the authentication calibration process, the CPU 81 sets the type of, or the identification information on, the extended input device 200, to which the right controller 4 is attached. In an example, in the case of having acquired the type of, and the identification information on, the extended input device 200 from the communication target provided in the extended input device 200, the CPU 81 refers to the type of, and the identification information on, the extended input device 200 in the NFC data Da3 to authenticate the type of, and the identification information on, the extended input device 200. In another example, in the case where the user makes an operation of selecting the type of, or the identification information on, the extended input device 200 by use of the main body apparatus 2, the left controller 3 or the extended input device 200 to which the right controller 4 is attached, the type of, or the identification on, the extended input device 200 is authenticated based on the result of the operation. The authentication process may be performed by the right controller 4.

In the above-described authentication calibration process, the CPU 81 performs a calibration for a subsequent process based on the result of calibration made by the user initial setting operation or the calibration information acquired from the communication target in the extended input device to which the right controller 4 is attached. In an example, in the case where the CPU 81 has acquired information on the reference position from the communication target provided in the extended input device 200, the CPU81 refers to the information on the reference position in the NFC data Da3 to set a correction value usable for future position calculation. In another example, in the case where the user makes a predetermined user initial setting operation by use of the extended input device 200 to which the right controller 4 is attached, the CPU 81 sets a correction value usable for future position calculation based on the information on the reference position set by the user initial setting operation. The calibration process may be performed by the right controller 4. In this case, the coordinate axis for the analysis window may be set by the right controller 4 based on the information on the reference position.

Next, the CPU 81 acquires the operation data from the right controller 4 to update the operation data Da (step S164), and advances the process to the next stop. For example, the CPU 81 updates the cluster data Da1 and the cluster number data Da2 in accordance with the operation data acquired from the right controller 4.

Next, the CPU 81 calculates the content of input made by use of the extended input device 200 based on the center-of-gravity coordinate and the average luminance of each of clusters extracted from the captured image captured by the infrared image capturing section 123 (step S165), and advances the process to the next stop. For example, the CPU 81 calculates the content of input made by use of the extended input device 200, based on the center-of-gravity coordinate and the average luminance of each of the clusters represented by the cluster data Da1 updated in step S164 and also based on the number of clusters represented by the cluster number data Da2 updated in step S164. In an example, a cluster having an average luminance equal to, or higher than, a predetermined threshold level is determined by the CPU 81 as a cluster corresponding to an image of an infrared LED. The CPU 81 also specifies an infrared LED 203 that is turned on, among the plurality of infrared LEDs 203, based on the center-of-gravity coordinate of the cluster on which the calibration performed in step S163 is reflected. The input key 205 corresponding to the infrared LED 203 specified as being turned on is determined by the CPU 81 as an input key operated by the user. Then, the CPU 81 updates the operation content data Db by use of the content that is input by use of the input key 205.

Next, the CPU 81 sets an input letter that is input by the user, based on the content of input made by use of the extended input device 200 (step S168), and advances the process to the next stop. For example, the CPU 81 refers to the operation content data Db to acquire the input key 205 operated by the user, sets an input letter corresponding to the input key 205 and updates the input letter data Dc. In the case where the user uses the extended input device 200 to input an instruction different from the letter input (e.g., an instruction to erase a letter, an instruction to convert a letter, an instruction to save a letter input, an instruction to change the type of a letter, an instruction to move a displayed item such as a letter, a cursor or the like, an instruction to perform a predetermined process, etc.), the input letter data Dc may be updated by use of the content of the instruction. For distinguishing the content of the instruction made by the user, a general method for distinguishing a user instruction based on an input to a keyboard is usable.

Next, the CPU 81 performs a process of displaying the input letter on the display device (step S167), and advances the process to the next stop. For example, the CPU 81 performs a process of updating the letter that is input by the user when necessary based on the input letter data Dc, and displaying the post-update letter on the display device (e.g., the display 12 of the main body apparatus 2).

Next, the CPU 81 determines whether or not to finish the input operation (step S168). A condition under which the input operation is to be finished in step S168 is, for example, that the conditions for finishing the input operation are satisfied, or that the user made an operation of finishing the input operation. When determining not to finish the input operation, the CPU 81 returns the process to step S164 to repeat the above-described processes. When determining to finish the input operation, the CPU 81 finishes the process in this flowchart. The series of processes in steps S164 through S168 are repeated until it is determined to finish the input operation in step S168.

As described above, in the exemplary embodiment, an infrared LED provided in an extended input device is turned on or off in accordance with a user input or a user operation made on the extended input device. The user input or the user operation made on the extended input device is detected based on the captured image of the infrared LED captured by the infrared image capturing section 123 of the right controller 4 attached to the extended input device. Therefore, the extended input device does not need to include an electric component such as an electronic circuit or the like that transmits the result of the content of input or the content of operation made by the user to the main body apparatus 2. For this reason, in the exemplary embodiment, the structure of the extended input device is simplified. In addition, in the exemplary embodiment, an image of the plurality of infrared LEDs in the state of being turned on or turned off is captured, so that the user input or the user operation made on the extended input device is distinguished. Therefore, various types of extended input devices may be added by use of the same predetermined data format (i.e., data generated in the first mode or the second mode) with no need to prepare a new data format, as long as this is permitted by the resolution or the processing capability of the infrared image capturing section 123. In the exemplary embodiment, the data transmitted from the right controller 4 to the main body apparatus 2 is, for example, data on the position of the cluster included in the captured image, but not data itself representing the captured image captured by the infrared image capturing section 123. Therefore, the amount of data to be transmitted from the right controller 4 to the main body apparatus 2 is decreased.

In the above-described example, the data that is based on the captured image and is transmitted from the right controller 4 to the main body apparatus 2 may be data representing the captured image itself captured by the infrared image capturing section 123. In this case, the amount of data to be transmitted from the right controller 4 to the main body apparatus 2 may be increased. Nevertheless, various analysis processes may be performed on the captured image by the main body apparatus 2.

In the above-described example, one infrared LED is changed from an off state to an on state in accordance with the user input or the user operation made on the extended input device. The state of the infrared LED may be changed in another form. For example, when the user makes a predetermined input to, or a predetermined operation on, the extended input device, one infrared LED may be changed from an on state to an off state. Alternatively, when the user makes a predetermined input, or a predetermined operation, on the extended input device, a plurality of infrared LEDs may be changed from an off state to an on state. In the case where the plurality of infrared LEDs are changed to an on state, the user input or the user operation is specified based on the combination of the plurality of infrared LEDs that are changed to an on state.

In the above-described example, the user input or the user operation made on the extended input device is distinguished based on whether the infrared LED is turned on or off. The user input or the user operation may be distinguished in another form. For example, the user input or the user operation may be distinguished by use of an on/off control on a DMD (digital mirror device), a transmission-type LCD (e.g., an infrared backlight unit) or the like. In the above-described example, the infrared LED is turned on or off when the user's body and the electrode contact each other or when the user turns the switch on or off. Alternatively, another method of detecting whether the user has made a user input or a user operation may be used. In a first example, an LED emitting light of a predetermined wavelength and a photodiode that, when the light emitted by the LED is reflected by the user's body (e.g., user's finger), receives the reflected light of the predetermined wavelength are provided. In this case, an infrared LED that is turned on when the photodiode receives the reflected light of the predetermined wavelength is provided, and the infrared image capturing section 123 of the right controller 4 captures an image of the infrared LED in the state of being turned on or off. Thus, the presence/absence of the user's body or the motion of the user's body (e.g., a pulsatory motion of the user's body) in a space in the vicinity of the LED and the photodiode is distinguished. In a second example, a first optical fiber group including first optical fibers and a second optical fiber group including second optical fibers are provided. The first optical fibers each transfer infrared light emitted by an infrared LED from one end and output the infrared light to the outside from the other end. When the infrared light that is output from the other end of either one of the first optical fibers is reflected by the user's body (e.g., user's finger), the reflected infrared light is received by one end of either one of the second optical fibers. In this case, an image of the reflected infrared light that is output from the other end of either one of the second optical fibers is captured by the infrared image capturing section 123 of the right controller 4. Thus, the presence/absence of the user's body or the motion of the user's body (e.g., a pulsatory motion of the user's body) in a space in the vicinity of the other end of the first optical fiber group and the one end of the second optical fiber group is distinguished. In a third example, an infrared LED that is turned on when a proximity sensor such as an electrostatic capacitance touch sensor or the like detects an item (e.g., user's body) is provided. The infrared image capturing section 123 of the right controller 4 captures an image of the infrared LED in the state of being on or off, so that it is determined whether the item is detected by the proximity sensor or not.

In the above-described example, the user input or the user operation made on the extended input device may be distinguished based on whether the infrared LED is turned on or off. Alternatively, the user input or the user operation is distinguished by use of the brightness of the light of the infrared LED. In the case where, for example, the value of each of the bits of the above-described digital information, the amount of the user operation (e.g., the amount or the force of pressing the button, the amount of inclining the operation lever, etc.) or the amount of the user input (e.g., the volume of the sound that is input to the microphone, the amplitude of the vibration, etc.) is represented based on whether the infrared LED is turned on or off, the brightness of the light of the infrared LED (e.g., the average luminance or the size of the circumscribed rectangle of the cluster in the first mode) may be used. In this case, the amount of information that may be represented by the captured image of the infrared LED is increased. A plurality of user inputs or a plurality of user operations may be distinguished even with a captured image of a single infrared LED.

In the above-described example, the infrared image capturing section 123 captures an image of the infrared light emitted by the infrared LED. Alternatively, light of another wavelength may be used. For example, the user input or the user operation made on the extended input device may be distinguished in substantially the same manner even by use of a light emitting portion that emits light of a specific wavelength (e.g., visible light) and an image capturing section capable of capturing an image of the light emitted by the light emitting portion, needless to say.

In the above-described example, the user input or the user operation made on the extended input device may be detected by use of the motion or the attitude of the right controller 4 attached to the extended input device, instead of the captured image of the infrared LED captured by the infrared image capturing section 123. For example, the motion or the attitude of the right controller 4 attached to the extended input device is calculated by use of an acceleration generated in the right controller 4, calculated by use of an angular velocity generated in the right controller 4, or calculated by a combination of the acceleration and the angular velocity generated in the right controller 4. In this case, based on the motion or the attitude of the right controller 4 attached to the extended input device, the attitude of the user operating the extended input device (e.g., the attitude of the user holding the neck of a musical instrument-type extended input device in the form of a guitar with his/her left hand or right hand) may be distinguished, the operation of the user of inclining or moving the main body of the extended input device may be detected, or the direction in which the main body of the extended input device is inclined may be detected.

The main body apparatus 2, the left controller 3 and the right controller 4 may each be any apparatus, for example, a mobile game apparatus, a mobile electronic device (a PDA (personal digital assistant), a mobile phone, a personal computer, a camera, a tablet, etc.) or the like.

An example of executing the information process (e.g., letter input process or game process) by the main body apparatus 2 is described above. Alternatively, at least a part of the above-described processing steps may be executed by another apparatus. For example, in the case where the main body apparatus 2 is configured to be communicable with another apparatus (e.g., another server, another image display device, another game apparatus, another mobile terminal, etc.), at least a part of the above-described processing steps may be executed by cooperation of the main body apparatus 2 and the another apparatus. In the case where at least a part of the above-described processing steps is executed by another apparatus as described above, substantially the same processes as the above-described processes may be executed. The above-described information process may be executed by one processor or by cooperation of a plurality of processors included in an information processing system including at least one information processing apparatus. In the above-described example, the CPU 81 of the main body apparatus 2 may execute a predetermined program to perform the information process. A part of, or the entirety of, the above-described processes may be executed by a dedicated circuit included in the main body apparatus 2.

In the above-described variations, the exemplary embodiment may be realized by a system form of so-called cloud computing, or a system form of distributed wide area network or local area network. For example, in a system form of distributed local area network, the above-described processes may be executed by cooperation of a stationary information processing apparatus (stationary game apparatus) and a mobile information processing apparatus (mobile game apparatus). In such a system form, there is no particular limitation on which apparatus performs which of the above-described processes. In whichever manner the processes may be divided, the exemplary embodiment is realized.

The orders of processes, the set values, the conditions used for the determinations, and the like that are used in the information processing described above are merely illustrative. The exemplary embodiment is realized also other orders, other values, and other conditions.

The above-described program may be supplied to the main body apparatus 2 or the right controller 4 via an external storage medium such as an external memory or the like, or via a wired or wireless communication link. The program may be stored in advance on a non-volatile storage device located in the apparatus. Examples of the information storage medium on which the program may be stored may include CD-ROMs, DVDs, optical disk storage mediums similar thereto, flexible disks, hard disks, magneto-optical disks, magnetic tapes and the like, as well as non-volatile memories. Alternatively, the information storage medium on which the program may be stored may be a volatile memory. Such a storage medium is considered as a computer-readable storage medium. For example, a program stored on such a storage medium may be loaded on, and executed by, a computer or the like, so that various functions described above are provided.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses may be improved and modified in various manners without departing from the spirit and scope of the appended claims. It is understood that the scope of the systems, the methods, the devices, and the apparatuses should be interpreted only by the scope of the appended claims. It is understood that the specific descriptions of the exemplary embodiment enable a person skilled in the art to carry out an equivalent scope thereto on the basis of the descriptions of the exemplary embodiment and general technological knowledge. It should be understood that the descriptions of the components and the like made in the specification in the singular form with the word "a" or "an" preceding the components do not exclude the plurals of the components. It should be understood that, unless otherwise stated, the terms used in the specification are used in their common meanings in the art. Thus, unless otherwise defined, all the jargons and the technical terms used in the specification have the same meanings as those generally understood by a person skilled in the art of the exemplary embodiment. If there is a contradiction, the specification (including definitions) takes precedence.

As described above, the exemplary embodiment is usable as an information processing system realized with a simple structure, an extended input device case, an information processing method, or the like.

What is claimed is:

1. An information processing system, comprising:
    an information processing apparatus executing an information process;
    a data transmission device transmitting data to the information processing apparatus; and
    an extended input device secured to the data transmission device;
    wherein:
    the data transmission device includes:
        an image capturing unit; and
        a computer transmitting, to the information processing apparatus, at least data generated based on an image captured by the image capturing unit;
    the extended input device includes:
        a securing portion secured to the data transmission device;
        an operation input portion usable by a user to make a user input and/or a user operation for the information process; and
        a light emitting unit located such that an image thereof is allowed to be captured by the image capturing unit, the light emitting unit emitting light, an image of which is allowed to be captured by the image capturing unit in accordance with the user input to, and/or the user operation on, the operation input portion, in a state where the light emitting unit is secured to the data transmission device; and
    the information processing apparatus includes a computer receiving the transmitted data and executing the information process based on the received data.

2. The information processing system according to claim 1, wherein:
    the operation input portion includes a plurality of operation input members; and
    the light emitting unit includes a plurality of light emitting members, and at least one of the plurality of light emitting members, corresponding to at least one of the operation input members subjected to the user input and/or the user operation, emits light.

3. The information processing system according to claim 2, wherein:
    the computer of the data transmission device acquires coordinate information on a portion having a high luminance in the image captured by the image capturing unit;
    in the transmitting of the data to the information processing apparatus, the acquired coordinate information is transmitted as the data generated based on the image captured by the image capturing unit; and
    in the executing of the information process, it is specified which one of the plurality of light emitting members is emitting light based on the received data, and the information process is executed based on the user input to, and/or the user operation on, the operation input member corresponding to the light emitting member that is emitting light.

4. The information processing system according to claim 2, wherein:

the image capturing unit is an infrared camera; and
the plurality of light emitting members are a plurality of infrared LEDs.

5. The information processing system according to claim 4, wherein the plurality of infrared LEDs are each located at any of positions arrayed in a matrix on a predetermined surface.

6. The information processing system according to claim 5, wherein the predetermined surface is located inclined with respect to an image capturing direction of the image capturing unit, in a state where the predetermined surface is secured to the data transmission device.

7. The information processing system according to claim 1, wherein:
the information processing apparatus is a game apparatus main body;
the data transmission device is a game controller including an operation unit; and
in the transmitting of the data to the information processing apparatus, data including at least data from the operation unit of the data transmission device and the data generated based on the image captured by the image capturing unit is transmitted.

8. The information processing system according to claim 1, wherein:
the operation input portion includes a plurality of switches turned on or off in accordance with the user input and/or the use operation; and
the light emitting unit includes a plurality of light emitting members, and at least one of the plurality of light emitting members corresponding to at least one of the plurality of switches turned on in accordance with the user input and/or the use operation is made conductive to emit light.

9. The information processing system according to claim 1, wherein:
the operation input portions includes a plurality of contact members contactable with a body of the user; and
the light emitting unit includes a plurality of light emitting members, and at least one of the plurality of light emitting members corresponding to at least one of the plurality of contact members in contact with the body of the user is made conductive to emit light.

10. The information processing system according to claim 2, wherein the light emitting unit causes different light emitting members, among the plurality of light emitting members, to emit light in accordance with an amount of the user input to, and/or the user operation on, the operation input member.

11. The information processing system according to claim 1, wherein:
the computer of the data transmission device performs near field communication with another device;
the extended input device further includes an information storage medium, performing the near field communication with the data transmission device, at a position where the information storage medium is capable of performing the near field communication in a state of being secured to the data transmission device by the securing portion;
in the transmitting of the data to the information processing apparatus, data including at least data acquired from the information storage medium by the near field communication and the data generated based on the image captured by the image capturing unit is transmitted; and in the executing of the information process, the information process is executed in accordance with the user input and/or the user operation made by use of the extended input device, based on the data acquired from the information storage medium and the data generated based on the image captured by the image capturing unit.

12. An extended input device usable together with a data transmission device including an image capturing unit and a computer transmitting, to an information processing apparatus executing an information process, at least data generated based on an image captured by the image capturing unit, the extended input device comprising:
a securing portion secured to the data transmission device;
an operation input portion usable by a user to make a user input and/or a user operation for the information process; and
a light emitting unit located such that an image thereof is allowed to be captured by the image capturing unit, the light emitting unit emitting light, an image of which is allowed to be captured by the image capturing unit in accordance with the user input to, and/or the user operation on, the operation input portion, in a state where the light emitting unit is secured to the data transmission device.

13. The extended input device according to claim 12, wherein:
the operation input portion includes a plurality of operation input members; and
the light emitting unit includes a plurality of light emitting members, and at least one of the plurality of light emitting members, corresponding to at least one of the operation input members subjected to the user input and/or the user operation, emits light.

14. The extended input device according to claim 13, wherein:
the image capturing unit is an infrared camera; and
the plurality of light emitting members are a plurality of infrared LEDs.

15. The extended input device according to claim 14, wherein the plurality of infrared LEDs are each located at any of positions arrayed in a matrix on a predetermined surface.

16. The extended input device according to claim 15, wherein the predetermined surface, in a state of being secured to the data transmission device, is located inclined with respect to an image capturing direction of the image capturing unit.

17. The extended input device according to claim 12, wherein:
the operation input portion includes a plurality of switches turned on or off in accordance with the user input and/or the use operation; and
the light emitting unit includes a plurality of light emitting members, and at least one of the plurality of light emitting members corresponding to at least one of the plurality of switches turned on in accordance with the user input and/or the use operation is made conductive to emit light.

18. The extended input device according to claim 12, wherein:
the operation input portions includes a plurality of contact members contactable with a body of the user; and
the light emitting unit includes a plurality of light emitting members, and at least one of the plurality of light emitting members corresponding to at least one of the plurality of contact members in contact with the body of the user is made conductive to emit light.

19. The extended input device according to claim 13, wherein the light emitting unit causes different light emitting members, among the plurality of light emitting members, to emit light, in accordance with an amount of the user input to, and/or the user operation on, the operation input member.

20. The extended input device according to claim 12, wherein:
the computer of the data transmission device performs near field communication with another device; and
the extended input device further includes an information storage medium, performing the near field communication with the data transmission device, at a position where the information storage medium is capable of performing the near field communication in a state of being secured to the data transmission device by the securing portion.

21. An information processing method for executing an information process based on an image captured by an image capturing unit, the method comprising:
making a user input and/or a user operation for the information process by a user;
emitting light, an image of which is allowed to be captured by the image capturing unit, in accordance with the user input and/or the user operation;
capturing an image of the emitted light by the image capturing unit; and
executing the information process based on at least data generated based on the image captured by the image capturing unit; wherein:
making the user input and/or the user operation includes making the user input and/or the user operation by use of a plurality of operation input members;
emitting light includes emitting light by at least one of a plurality of light emitting members, corresponding to at least one of the plurality of operation input members subjected to the user input and/or the user operation;
the information processing method further comprises generating coordinate information on a portion having a high luminance in the image captured by the image capturing unit, as data generated based on the image captured by the image capturing unit; and
executing the information process includes specifying which one of the plurality of light emitting members is emitting light based on the coordinate information, and executing the information process based on the user input to, and/or the user operation on, the operation input member corresponding to the light emitting member that is emitting light.

* * * * *